United States Patent
Aamodt et al.

(10) Patent No.: US 6,732,114 B1
(45) Date of Patent: May 4, 2004

(54) SYSTEM AND METHOD FOR CREATING A CUSTOMIZABLE NETWORK DIAGRAM

(75) Inventors: Jeffrey R. Aamodt, Sammamish, WA (US); Alexander A. Sourov, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 325 days.

(21) Appl. No.: 09/703,756

(22) Filed: Nov. 1, 2000

(51) Int. Cl.[7] .............................................. G06F 17/30
(52) U.S. Cl. ...................................................... 707/102
(58) Field of Search ................................ 707/3, 7, 102, 707/530; 345/440, 467, 764, 765; 600/300; 700/36, 95, 97, 107; 701/29; 705/1, 7, 9, 29; 706/51; 709/202, 204, 205, 223, 224, 225, 226, 227, 231, 246; 714/35; 717/109

(56) References Cited

U.S. PATENT DOCUMENTS

| | | | | |
|---|---|---|---|---|
| 5,101,340 A | * | 3/1992 | Nonaka et al. .............. | 717/109 |
| 5,414,809 A | * | 5/1995 | Hogan et al. ................ | 345/765 |
| 5,905,884 A | * | 5/1999 | Williams ..................... | 709/227 |

OTHER PUBLICATIONS

Szirmay–Kalos, Laszlo' "Dynamic Layout Algorithm to Display General Graphics," *Graphic Design* 1994, pp. 505–517.

* cited by examiner

Primary Examiner—Diane D. Mizrahi
Assistant Examiner—Apu Mofiz
(74) Attorney, Agent, or Firm—King & Spalding LLP

(57) ABSTRACT

A network diagram layout engine can automatically determine the layout of nodes of information within a chart on a display screen while permitting manual adjustment of other nodes. The network diagram layout engine can also filter the types of nodes that will be displayed. The network diagram layout engine can support various automatic layout schemes or spatial arrangements of the nodes that can be modified or adjusted manually by the user. The network diagram layout engine can create a network diagram that highlights the interrelationships between respective nodes by substantially reducing intersections of links between nodes. That is, the network diagram layout engine can create a network diagram that includes a plurality of nodes that are linked together to form one or more node chains. The one or more node chains can provide a balanced and logical presentation of the interrelationships between the nodes where links between nodes flow in a substantially smooth manner between respective links.

20 Claims, 22 Drawing Sheets

SYSTEM AND METHOD FOR CREATING A CUSTOMIZABLE NETWORK DIAGRAM

CROSS REFERENCE TO RELATED APPLICATION

This application is related to U.S. patent application Ser. No. 09/703,748 filed Nov. 1, 2000, entitled "System and Method for Creating Customizable Nodes in a Network Diagram"

TECHNICAL FIELD

The present invention relates to computer systems for generating charts and graphs. More particularly, the present invention relates to computer systems that create network diagrams that can track project planning and scheduling.

BACKGROUND OF THE INVENTION

Many conventional project planning software applications provide multiple chart formats for project scheduling data. However, the conventional project planning software applications do not display the project scheduling data in a manner that defines the interrelationships between multiple tasks that may comprise a single work project in an organized manner which can be manipulated or customized by a user.

For example, the simplest scheduling tool is the bar or Gantt chart. In this conventional format, work activities or tasks are listed in a vertical direction while elapsed time for each work activity or task is recorded horizontally. This chart format clearly shows the date by which an activity should start and finish, but this format does not make clear how the ability to start one activity depends upon the successful completion of other activities. In other words, the relationships between work activities of the whole project are not easily ascertainable by reviewing the project data in this format.

In addition to the lack of clarity between work tasks of the Gantt chart, conventional project planning software does not permit significant customizable features for displaying work project data. For example, the conventional art does not permit the customization of shapes or sizes of individual nodes that may represent tasks or work activities of a project. That is, the conventional art does not provide a mechanism in which the user can select specific shapes for particular work tasks. Further, conventional project planning software does not permit user customization of the final screen locations of nodes within the chart.

For example, conventional project planning software usually does not permit a user to select portions of a chart for customization. In other words, a user cannot select a specific node on a chart and manipulate it further while it is displayed as a chart or diagram. Also, conventional project planning software does not provide any mechanism in which to filter nodes that may represent work tasks of a specific category. Stated differently, conventional project planning software does not permit a user to filter the displayed output or chart of project data such that only nodes representing work activities of a specific category are displayed.

Accordingly, there is a need in the art for a system and method for organizing and generating a network diagram that permits a user to customize the displayed output of the network diagram. There is the further need in the art for generating a network diagram that clearly displays the interrelationships between a plurality of nodes that make up an entire work project. Additionally, there is a need in the art for generating a network diagram that organizes project planning information in a well balanced manner that highlights the interrelationships between nodes and the interrelationships between one or more node chains.

SUMMARY OF THE INVENTION

The present invention is generally directed to a layout engine that determines the positioning of graphical items, called nodes, of a computer generated chart and automatically places the nodes to form the chart on a display screen. The nodes can represent work tasks that have specific starting times or ending times or both. The nodes can have established or predetermined relationships, called dependencies, between each other. That is, each node can be assigned a defined relationship, represented by lines-called links, relative to another node.

For example, a first node could represent the first task or job in a work project while a second node could represent a second task or job that can only be started upon completion of the first task. In this exemplary scenario, the second node would be called a successor of the first node. Because of the second node's dependency, the second node's position relative to the first node, according to one aspect of the invention, would be calculated to be on the right side of the first node.

Alternatively, the first node could represent a summary task and the second node could represent a first subtask of one or more subtasks to a job or mini-project that requires many steps. Similar to the previous task completion dependency scenario, the second node's position in this summary task/subtask scenario would be calculated to be on the right side of the first node. Thus, according to one aspect of the present invention, the layout engine of the present invention may use the concept that the flow of dependencies in a chart between nodes would be from left to right on a display screen.

Because of the dependencies between nodes, the present invention could be characterized as similar to conventional program modules that produce Program Evaluation and Review Technique (PERT) and Gantt Charts. However, the processing of data for the conventional art is much different than the present invention. Many conventional PERT and Gantt Chart program modules do not provide for the manual adjustment in combination with automatic adjustment for the placement of nodes. In other words, the arrangement of nodes with a conventional PERT Chart or Gantt Chart program module often is automatic and cannot be modified by a user.

Further, Conventional PERT and Gantt Chart program modules typically do not permit the filtering of nodes or displaying certain nodes based upon preset criteria. With the conventional art, usually the size, shape, and color of nodes are fixed and cannot be customized on an individual basis. In other words, most conventional chart program modules typically do not permit individual node formatting.

In contrast to the conventional art, the present invention can automatically determine the layout of some nodes within a chart on a display screen while permitting manual adjustment of other nodes. The present invention can also filter the types of nodes that will be displayed. More specifically, the present invention can support various automatic layout schemes or spatial arrangements of the nodes that can be modified or adjusted; manually by the user. The present invention can create a network diagram that highlights the interrelationships between respective nodes by substantially reducing and sometimes eliminating any intersections of links between nodes. That is, the present invention can create a network diagram that includes a plurality of nodes that are linked together to form one or more node chains. The one or more node chains can provide a balanced and logical presentation of the interrelationships between the nodes where links between nodes flow in a substantially smooth manner by reducing the intersections between respective links.

The layout engine of the present invention can support many diverse network diagram layout schemes. For example, the layout engine can support at least three layout schemes: (1) a layout scheme that begins at a top left corner of the display screen and expands down and to the right as nodes are laid out; (2) a layout scheme that begins near the middle of a left side of a display screen and expands evenly up and down and to the right as nodes are laid out; and (3) a layout scheme that begins in the middle of a network diagram at the top of the display screen and expands down evenly to the right and left, similar to an organization chart.

According to another aspect of the present invention, the first layout scheme can be formatted according to a timescale, where columns within the layout scheme can represent certain amounts of time, such as days, weeks, or months. In addition to the various layout schemes, the present invention can adjust the display of a particular chart because of changes in size, shape, categorization of a node, or filtering of nodes based on categorization, or any combination thereof These are just a few exemplary parameters that are tracked by the present invention. In other words, when these parameters are adjusted, the layout engine can compensate or recalculate a placement of a node because of the changes in individual formatting of a particular node, such as size or shape or both.

DETAILED DESCRIPTION OF EXEMPLARY EMBODIMENTS

Figure 1:
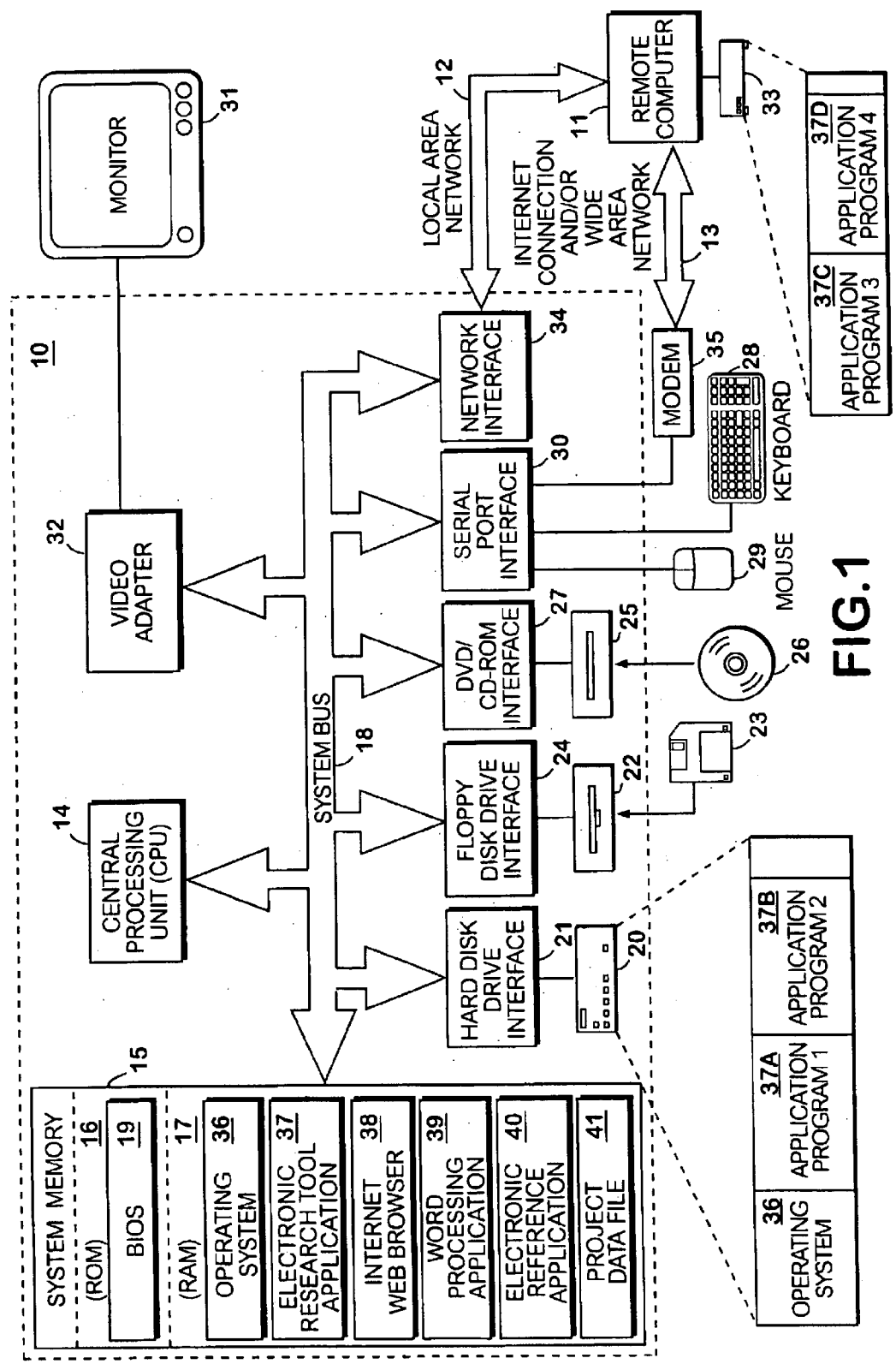
FIG. 1 is a block diagram of a network personal computer that provides the exemplary operating environment for the present invention.

The present invention can automatically determine the layout of some nodes within a chart on a display screen while permitting manual adjustment of other nodes. The present invention can also filter the types of nodes that will be displayed. More specifically, the present invention can support various automatic layout schemes or spatial arrangements of the nodes that can be modified or adjusted manually by the user. The present invention also permits customization of individual nodes and can adjust the entire network diagram because of individual node formatting characteristics. The network diagram produced by the present invention can emphasize the interrelationships between respective nodes by reducing any intersections of links between nodes. That is, the present invention can create a network diagram that includes a plurality of nodes that are linked together to form one or more node chains. The one or more node chains can provide a balanced and logical presentation of the interrelationships between the nodes where links between nodes or node chains or both, flow or progress in a substantially smooth manner with a reasonable number of intersections between respective links.

Although the preferred embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a central processing unit (CPU), memory storage devices for the CPU, display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the CPU via a communications network.

The processes and operations performed by the computer include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

Referring now to the drawings, in which like numerals represent like elements throughout the several figures, aspects of the present invention and the preferred operating environment will be described.

FIG. 1 illustrates various aspects of the preferred computing environment in which the present invention is designed to operate. Those skilled in the art will immediately appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or computer server.

The personal computer 10 includes a central processing unit (CPU) 14, such as "PENTIUM" microprocessors manufactured by Intel Corporation of Santa Clara, Calif. The personal computer also includes system memory 15, including read only memory (ROM) 16 and random access memory (RAM) 17), which is connected to the CPU 14 by a system bus 18. The preferred computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors, such as the "MIPS" or "POWER PC" families of microprocessors from Silicon Graphics and Motorola, respectively.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM OR DVD drive 25, which is used to read a CD-ROM OR DVD disk 26, is connected to the system bus 18 via a CD-ROM OR DVD interface 27. A user enters commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM OR DVD drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art can recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37, and data are provided to the personal computer 10 via computer-readable media. In the preferred computer, the computer-readable media include the local or remote memory storage devices, which may include the local hard disk drive 20, floppy disk 23, CD-ROM OR DVD 26, RAM 17, ROM 16, and the remote memory storage device 33. In the preferred personal computer 10, the local hard disk drive 20 is used to store data and programs, including the operating system and programs.

Figure 2A:
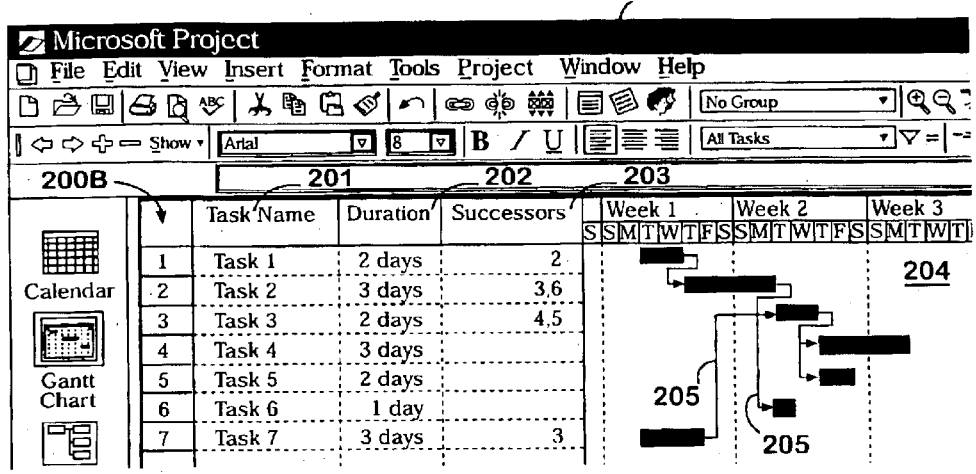
FIG. 2A illustrates a table of project data that can be manipulated by the layout engine of the present invention.

Referring now to FIG. 2A an exemplary display screen 200A of the present invention is illustrated. Project data 200B that will be used to create a network diagram 206A (discussed below with respect to FIG. 2B) is presented in a chart format. The project data 200B comprises columns of data that are labeled as follows: task name 201, duration 202, and successors 203. The data present in the task name column 201 can be defined by the user. Similarly, the project data present in the duration column 202 can also be defined by the user. While the data present in the duration column 202 is presented in a day format, it is noted that other time increments are not beyond the scope of the present invention.

The data in the successor column 203 can also be defined by a user. The successors column 203 identifies the relationships between a plurality of work activities for an entire project. For example, task 1 has a duration of two days and it has a successor task 2 that can only be started upon the completion of task 1. Therefore, task 1 can be considered a predecessor node that must occur or be completed before the dependent node or'successor task 2. Similarly, task 2 has a duration of 3 days and has successor tasks 3 and 6; Therefore, task 2 is a predecessor node to nodes 3 and 6 and must be completed or must occur before nodes 3 and 6.

Also illustrated in FIG. 2A is a Gantt chart 204 that corresponds to the project data present in the project table 200B. Many Gantt charts 204 do not provide much customization of individual nodes that form the chart. That is, each node typically has a similar color and shape relative to the other nodes that form the chart. Further, the interrelationships between nodes can be confusing because of the intersections of links 205 between respective nodes.

Figure 2B:
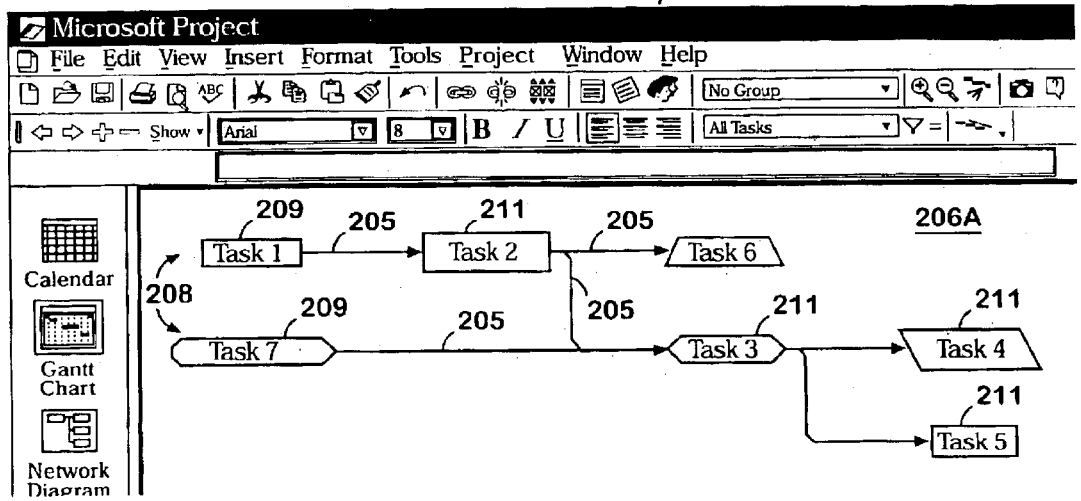
FIG. 2B is an exemplary network diagram for the project data of FIG. 2A according to the present invention.

FIG. 2B illustrates a display screen 207 that contains an exemplary network diagram 206A according to the present invention. Within the exemplary network diagram 206A, there are two node chains 208. Each node chain 208 comprises a top-level node 209 and dependent or successor nodes 211. According to the present invention, the term "summary node" or "summary task" defines a task that represents a consolidation of one or more subordinate tasks. A summary can be characterized as a roll-up of the subtasks and as the next level up in a outline level (e.g., subtasks at outline level 3 would be under a summary task at outline level 2). There is not necessarily any dependencies between the summary and subtasks, but with the algorithm discussed below an invisible dependency can be created in order to maintain the position relationship between nodes for layout purposes. "Dependent tasks" are a plurality of subordinate nodes or tasks that occur after another node or task. A "predecessor node" can be defined as an item that must occur or be completed before dependent items or nodes.

A "parent node" is either a summary or a predecessor node. It is noted that a node can have more than one parent node. A "subtask" can be defined as a subordinate node or task while a "successor node" is a node or task that is dependent on prior nodes or task. According to the present invention, a "child" may refer to subtasks or successors. A "top-level node" is defined as a node that has no parent. For example, as mentioned previously, nodes 209 of a node chain 208 are top-level nodes that do not have any corresponding parents nodes.

Conversely, nodes 211 have parent or predecessor nodes that must occur prior in time before the particular successor node. In the exemplary network diagram 206A illustrated, task 3 has two parent nodes. Namely, task 3 has task 2 and task 7 as its node parents. For network diagram 206A as illustrated in FIG. 2B, the layout scheme of "top down from left" is illustrated. However, other arrangements of the nodes are not beyond the scope of the present invention. Other arrangements of nodes include, but are not limited to, top down by day, top down by week, top down by month, top down-critical first, centered from left, and centered from top. In the exemplary embodiment, the top down from left layout can be the default arrangement of the nodes.

Figure 2C:
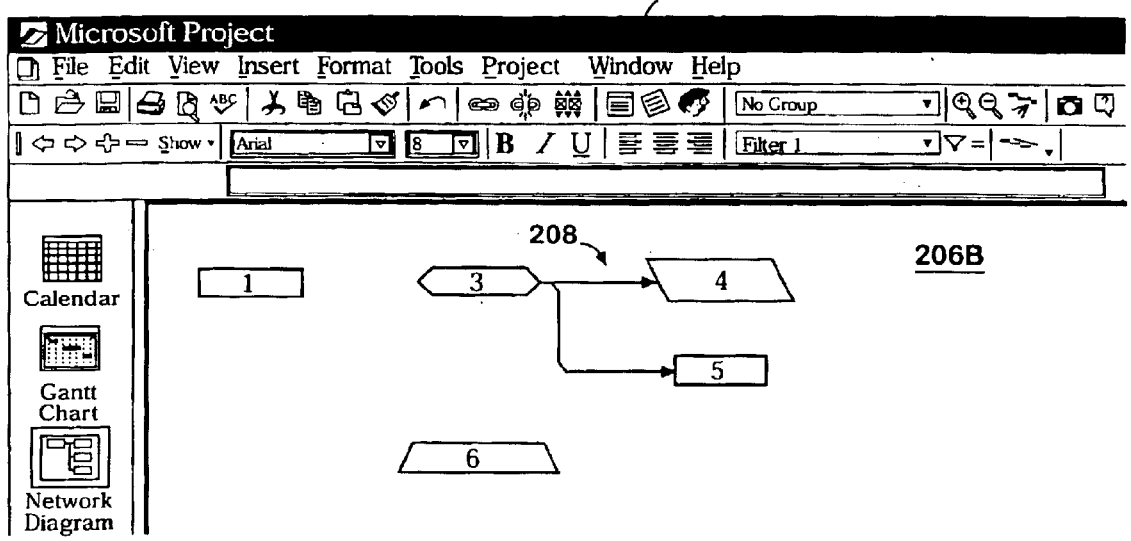
FIGS. 2C–2I illustrate various layout formats for network diagrams according to the present invention.

FIG. 2C illustrates a display screen 210 that contains another exemplary network diagram 206B according to the present invention. Within the exemplary network diagram 206B, there is one node chain depicted since task 2 and task 7 (not shown) have been filtered from this diagram. Task 2 and 7 will be characterized as "invisible" according to the present invention as will be discussed in further detail below. FIG. 2C illustrates an exemplary "filtered" network diagram 206B.

Figure 2D:
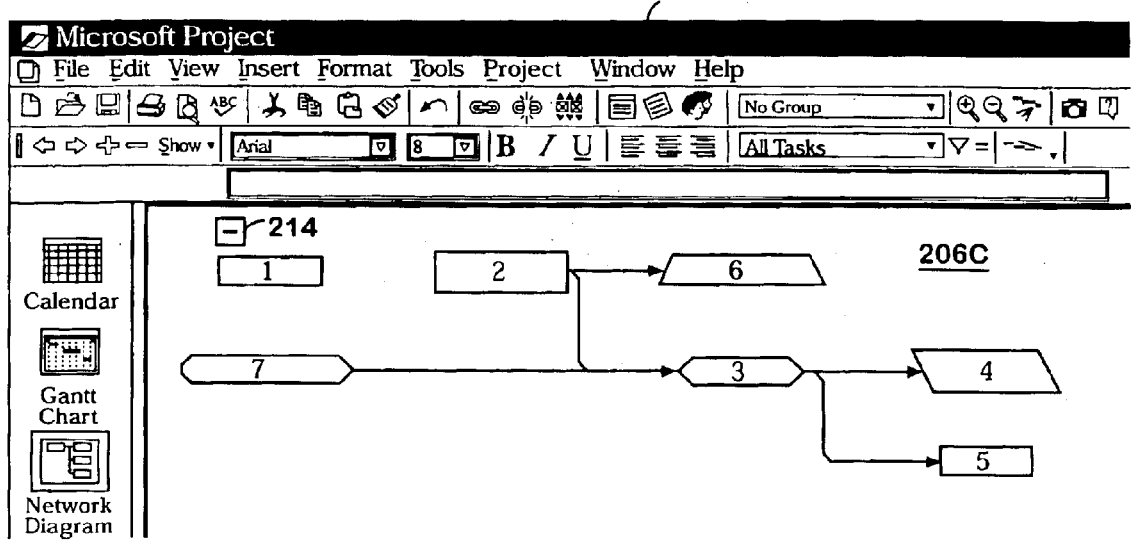

FIG. 2D illustrates' a display screen 213 that contains an exemplary network diagram 206C. In this exemplary network diagram 206C, task 1 has been designated as a summary task of task 2. Since task 1 is a summary task, an indicator 214 is disposed adjacent to task 1. Indicator 214 can be any type of indicator such as a box with a minus sign exposed in the middle portion thereof. FIG. 2D illustrates an expanded view of the network diagram 206C where both the summary task 1 and its corresponding detailed task 2 are displayed. In a collapsed view, task 2 will not be displayed (as will be discussed with respect to FIG. 2E below). In order to render a collapsed view of the exemplary network diagram 206C, the mouse pointer could be used to activate the screen indicator 214.

Figure 2E:
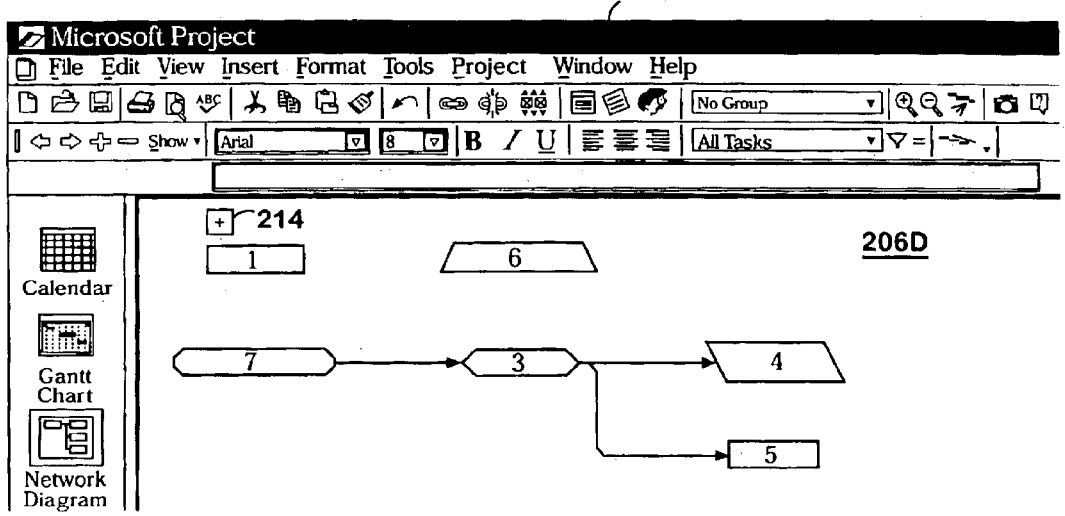

As mentioned above, when the screen indicator/collapse-expand indicator 214 is activated, the detailed task originating from a summary task will either be displayed or hidden from view. In FIG. 2E, detailed task 2 (not shown) of network diagram 206D is hidden from view since the collapse function, has been activated. Since the collapsed function has been activated, the screen indicator shows a "plus" sign within the box of the indicator 214.

Figure 2F:
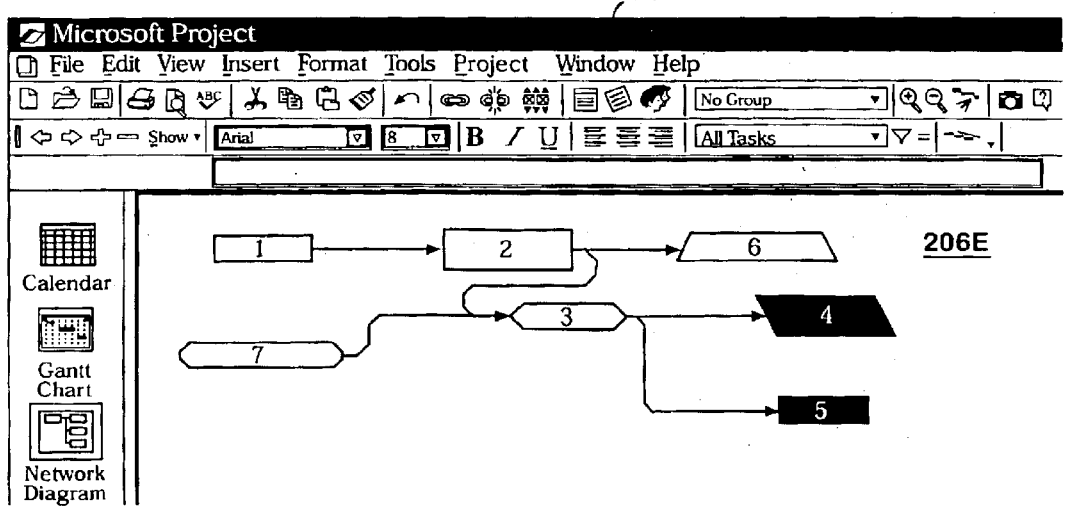

Referring now to FIG. 2F, another exemplary display screen 218 is illustrated. Within the exemplary network diagram 206E, task 3 was selected and moved by a user. The remaining tasks, such as task 4 and 5, were positioned automatically according to the present invention. Since task 3 was fixed, task 4 and 5 were automatically positioned in relation to task 3 which is their nearest fixed parent. Task 4 and 5 maintain the original offset spacing from task 3 as evidenced by FIG. 2B. FIG. 2F illustrates a "selective" layout as will be discussed below.

Figure 2G:
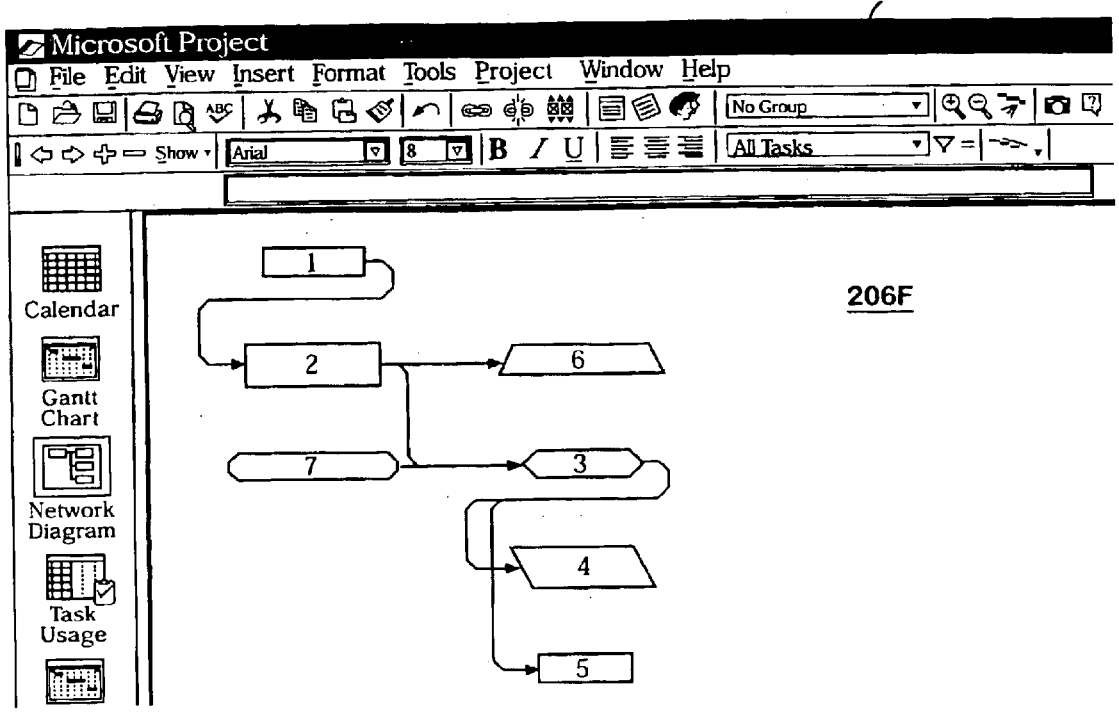

Referring now to FIG. 2G, a display screen 220 that contains another exemplary network diagram 206F is illustrated. Within exemplary network diagram 206F, the nodes are organized according to a time-based layout. In the particular exemplary scenario illustrated, network diagram 206F illustrates a "top down by week" layout in which the first column contains any task that may have a start day in the first week of a project while column 2 contains any task that may have a start date in a second week of a project. FIG. 2G illustrates a "time-based layout" as it will be discussed in further detail below.

Figure 2H:
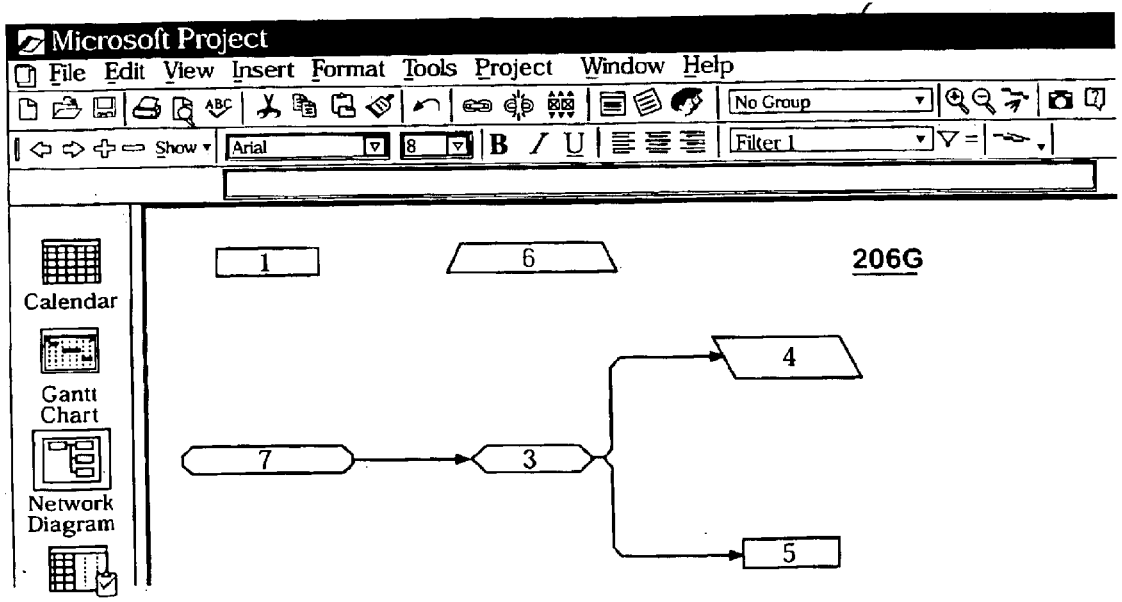

FIG. 2H illustrates a display screen 222 that contains an exemplary network diagram 206G according to the present invention. In the exemplary network diagram 206G, the nodes have been arranged according to a combination of two predefined layout options. One layout option that was selected was a "centered from left" layout option and another was a "filtered" layout option. For the "filtered" layout option, task 2 (not shown) has been filtered out from the network diagram 206G. FIG. 2H illustrates the diversity of options available with the present invention where multiple layout options can be selected simultaneously. The present invention is not limited to the combination of layout options illustrated in FIG. 2H and can include various other combinations of layout options that are selected simultaneously from a user.

Figure 2I:
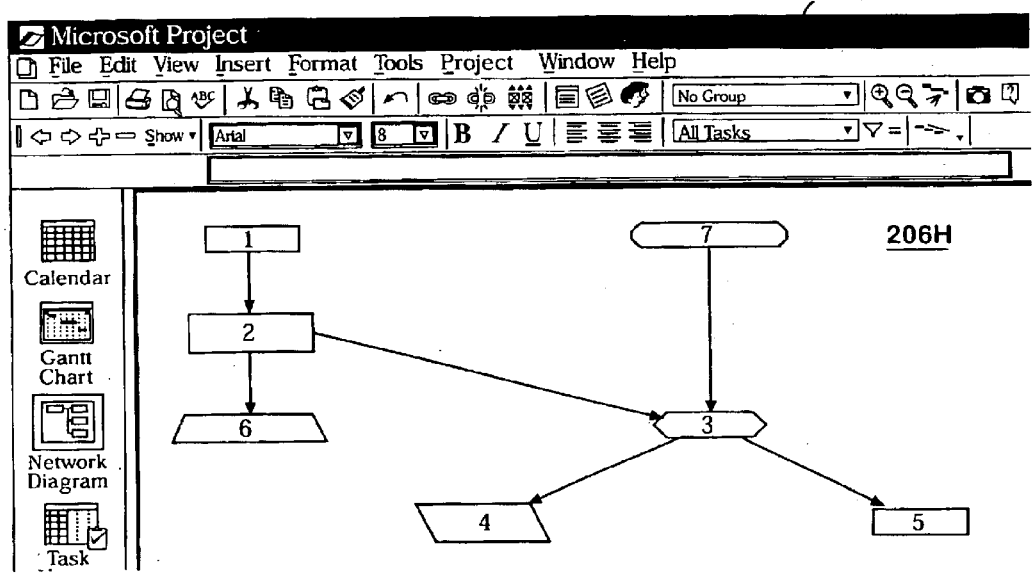

Referring now to FIG. 2I, a display screen 224 that contains an exemplary network diagram 206H is illustrated. Within the exemplary network diagram 206H the nodes have been arranged according to another exemplary layout option. Specifically, the tasks in exemplary network diagram 206H have been arranged according to a "centered from top" layout arrangement. Those skilled in the art will appreciate that the present invention is not limited to the layouts illustrated in the aforementioned figures. Other layout options include, but are not limited to, top down from left, centered from left, centered from top, top down by day, top down by week, top down by month, filtered layouts, selected (user-defined) layouts, expanded view layouts, collapsed view layouts, and any other like layouts in addition to any combination of layouts discussed above.

Figure 3A:
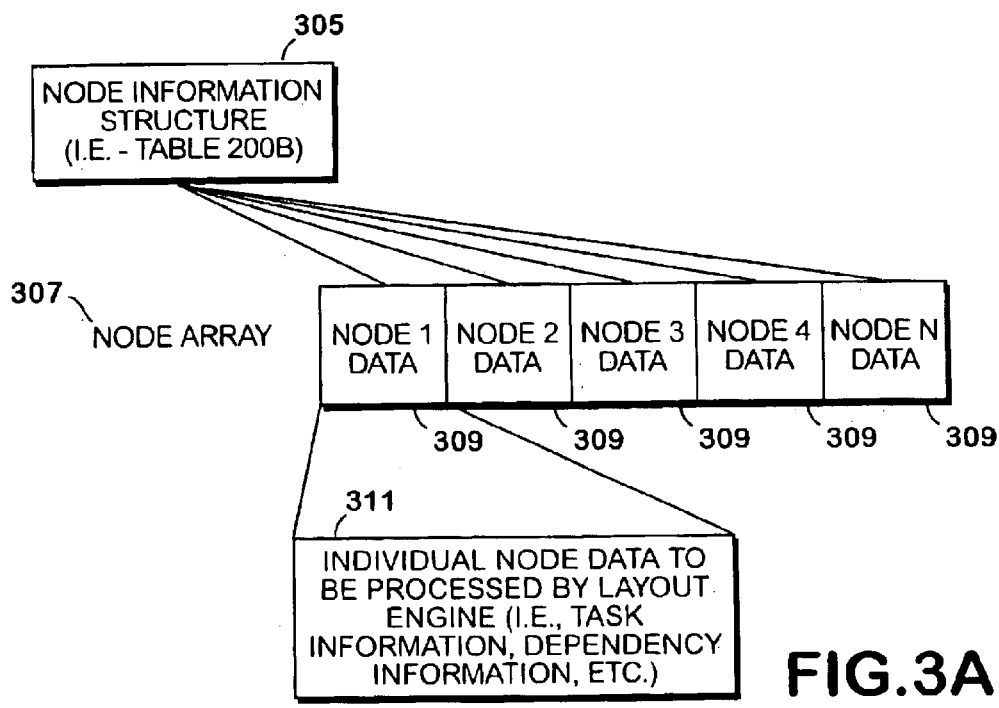
FIG. 3A illustrates an exemplary schematic of structured memory for node information for the present invention.

FIG. 3A illustrates and exemplary schematic of structured memory for node information 305 of the present invention. Node information 305 may comprise data such as an existing backend database like table 200B in FIG. 2A. The backend database may include a node array comprising multiple data elements 309. Each data element 309 may further comprise additional sub elements 311 that may be processed by the present invention. The sub elements of node data can include task name information, dependency information and other like parameters.

Figure 3B:
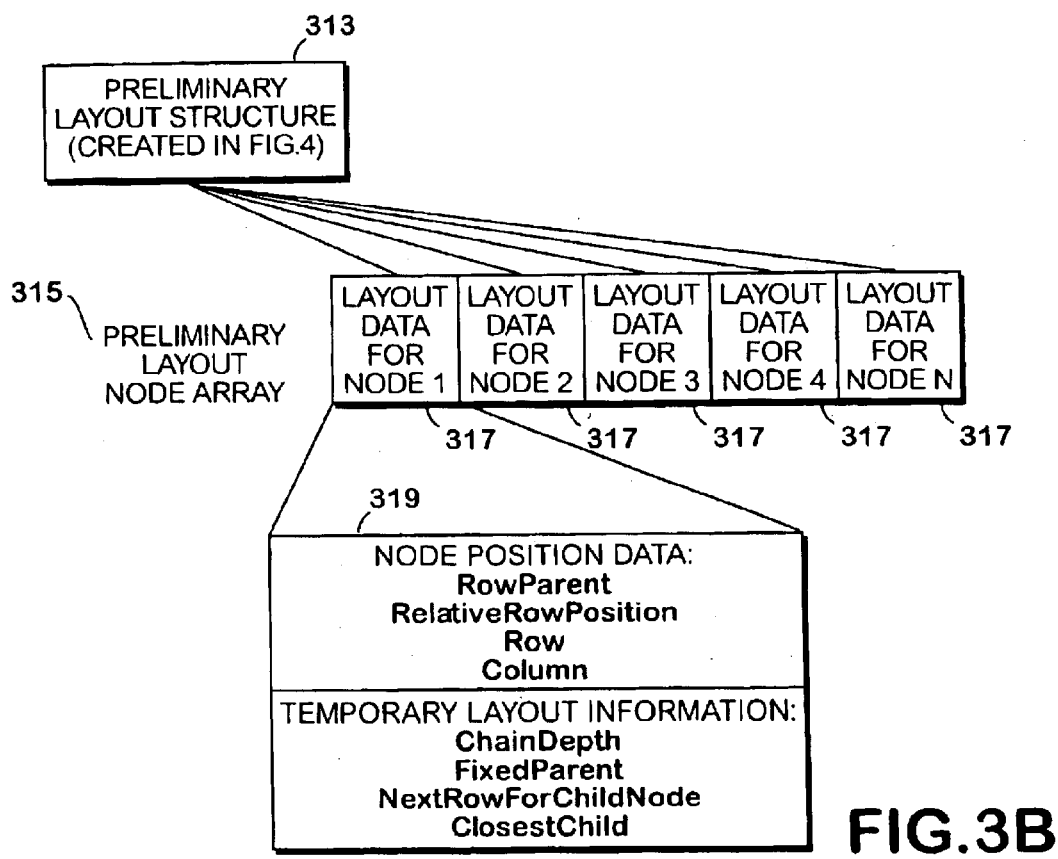
FIG. 3B illustrates an exemplary schematic of structured memory for preliminary layout information for the present invention.

FIG. 3B illustrates an exemplary schematic of structured memory for a preliminary layout structure 313 of the present invention that is created by the process described in FIG. 4 (as will be discussed below). The preliminary layout structure may comprise a preliminary layout node array that may also include multiple data elements 317. Each data element 317 may comprise multiple variables such as "RowParent," "RelativeRowPosition," "Row", "Column", "ChainDepth," "FixedParent," and "NextRowForChildNode", and "ClosestChild".

The variable "RowParent" can be defined as a parent node which determines the row position of a node being examined by the process. The variable "RelativeRowPosition" is the row offset for the node being examined from the row position of its row parent. The variable "Column" can represent the actual column position of a node being examined. The variable "Row" can represent the actual row position of a node. The variable "FixedParent" can define the closest ancestor node that does not get moved in a selective layout operation. The variable "NextRowForChildNode" may define the next available relative row in the virtual grid 212 for the row parent of the node being examined. The variable "ChainDepth" may define the position of a node relative to its placement within a node chain. The variable "ClosestChild" may define the next successor node of a current node that is closest to the current node.

As mentioned above, additional relationships between nodes are tracked in accordance with the exemplary detailed computer implemented processes illustrated in FIGS. 4–10. For example, a variable "LastVisibleNode" monitors the display status of one node compared to a node that is being evaluated or examined. LastVisibleNode can be the prior node (i.e., ancestor) in the chain that is both closest to the current node and visible. It is necessary to determine which last visible node precedes the current node, because hidden nodes that are not displayed cannot be used to position nodes that are displayed. The "LastVisibleNode" variable can assist in tracking at least one of the following conditions of an ancestor node relative to a node that is being examined by the present invention: (a) the filtering status of a node, (b) the expand or collapse status of a node, or (c) the visible or hidden summary task status of a node. The filtering status of a node means that a user can select specific data that is filtered within a network diagram. For example, nodes can be categorized according to a predefined format. A, node may be categorized as either "critical or "non-critical" in one exemplary embodiment. A user can select to display only "critical" or "non-critical" nodes. The variable "LastVisibleNode" would track only those nodes that are not filtered (displayed) in the diagram. The same concept applies for the other scenarios in which a:node could have either an expand or collapse status. In a collapsed status, a node may be invisible within a network diagram. In other words, a collapsed node would not been seen within a network diagram on a display. Similarly, if a node has been designed as a summary task according to its data as set forth in chart 200B of FIG. 2A, then such a node having a "hide summary task" status would not be visible on a network diagram. The variable "LastVisibleNode" would then only track the visible nodes, or in this scenario those nodes not having a summary task status.

Another relationship which is tracked by the detailed exemplary process of the present invention is whether the relative position of a node has been changed. The variable which tracks this information is entitled "PositionChanged." An array entitled, "ChildArray," tracks the children of a particular node that is being examined. For example, a parent node could have two children nodes. In such a scenario, the "ChildArray" would track or identify those children of the parent when the parent node is being examined during a particular iteration of the process. The variable "Child" tracks the most recent child node that is being examined by the process of the present invention. Another variable entitled, "Stack," stores the state of a node while the children of the node are being examined by the present invention. The "Stack" variable can be a temporary memory device where a "Push" command places a value on the stack and "Pop"command retrieves data from the stack. The stack can be characterized as a LIFO (Last-In-First-Out) device where data last entered into the stack is the data that is the first outputted from the stack. However, the present invention is not limited to "Stack" memory devices. Those skilled in the art will appreciate that other memory devices which can perform the LIFO function of a stack are not beyond the scope of the present invention. And lastly, the variable entitled "Current" tracks the current node under examination or during a particular iteration of the process. In other words, the "Current" variable identifies the particular node which is the focus of a single iteration of the process according to the present invention.

To determine the absolute row position of a node being examined, the row parent of the node and the relative row position need to be determined. For top-level nodes, the absolute row position and relative row position are equivalent. To give some context to the variables discussed above, referring to FIG. 3O, the absolute row position of task 3 is two since task 7 is its row parent. The relative row position for task 3 (relative to task 7) is zero. The layout column of task 3 is three. The next row for a child for task 3 is row four (not shown in FIG. 3O) since node 5 is present in row three.

Figure 3C:
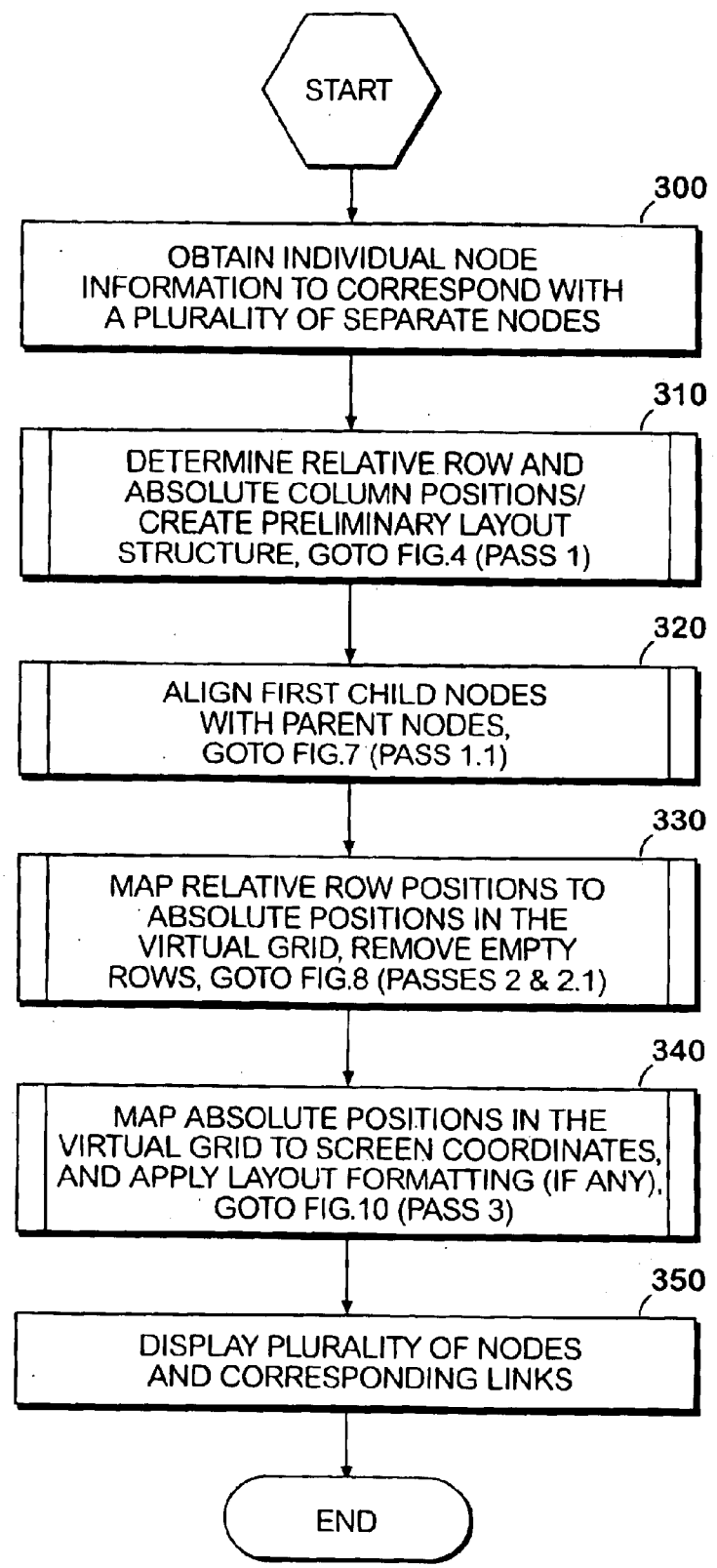
FIG. 3C is a detailed logic flow diagram illustrating a one exemplary embodiment for an exemplary network diagram layout process of the present invention.

FIG. 3C provides an overview of a detailed process of one exemplary embodiment where step 300 is the first step of the process. In step 300, individual node information that corresponds with a plurality of separate nodes is obtained. For example, in this step, data from a backend database, such as illustrated in table 200B of FIG. 2A, can be copied to form the node array 307, as illustrated in FIG. 3A. Alternatively, individual node information can be imported into node array 307 from another program module. Those skilled in the art will recognize that obtaining node information is not limited to the aforementioned examples.

After individual node information corresponding to a plurality of nodes has been acquired, in routine 310, relative row and absolute column positions are determined for each of the nodes in the node array 307. The data in node array 307 is manipulated or processed to create the preliminary layout structure 313 as illustrated in FIG. 3B. As mentioned previously, the "RelativeRowPosition" for a given node is the row offset of the node from the row position of a row parent node. A" RowParent" for a given node is a parent node which determines the row position of a given node.

In routine 320, any first child nodes that may have been repositioned relative to a parent are aligned directly with the parent. After routine 320, in routine 330, the variables which track the relative offset values of the relationships between respective nodes are mapped to absolute positions in the virtual grid 212. While mapping the relative offsets to absolute positions in the virtual grid 212, during this routine, empty rows are removed as illustrated in FIG. 3O.

Figure 3D:
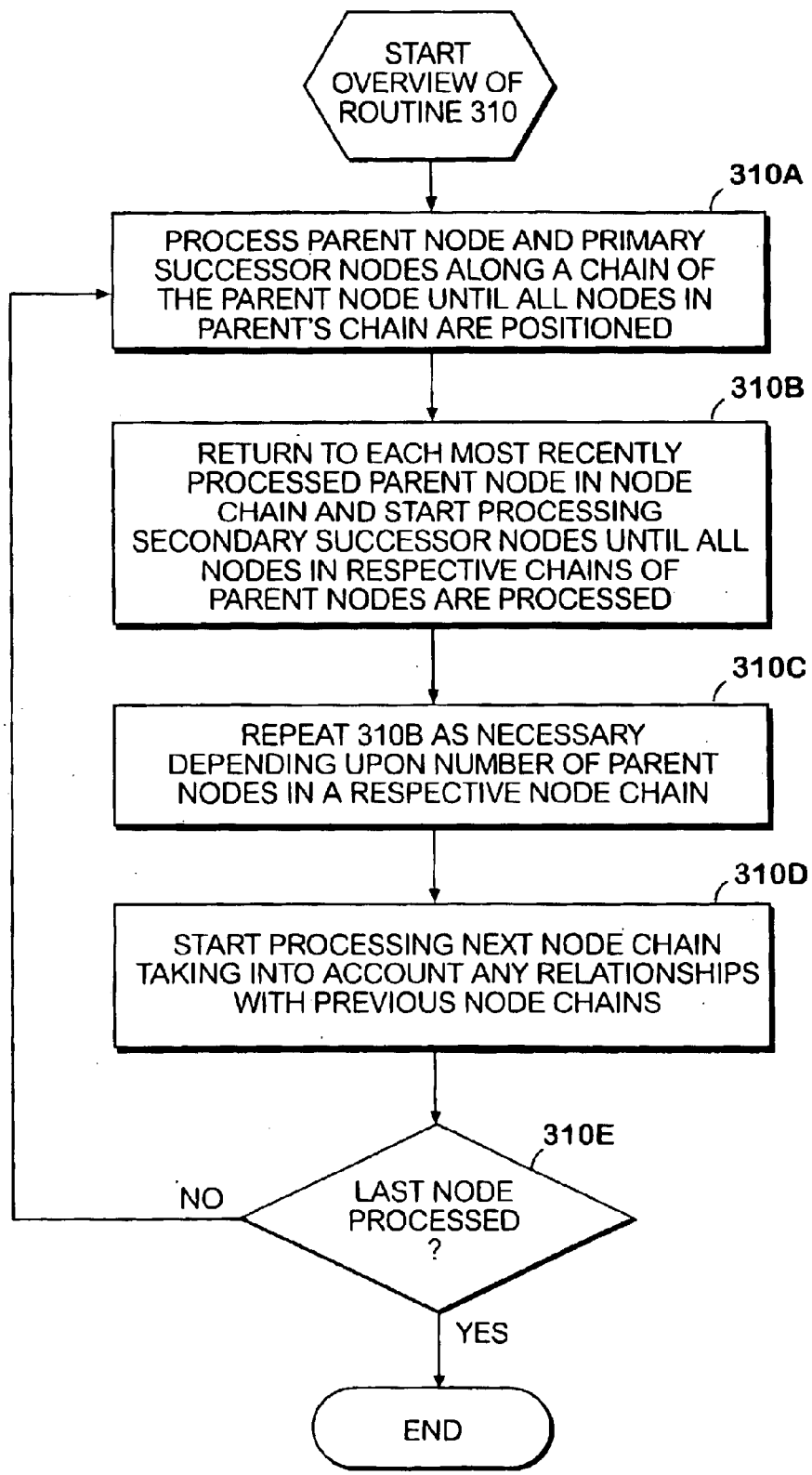
FIG. 3D is an overview logic flow diagram for the relative row and absolute column/create preliminary layout routine of FIG. 3C.
Figure 3E:
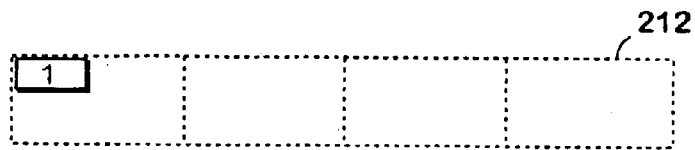
FIGS. 3E–3P illustrate the network diagram layout process of a virtual grid that is stored within memory of the present invention for the sample project data of FIG. 2A.
Figure 3F:
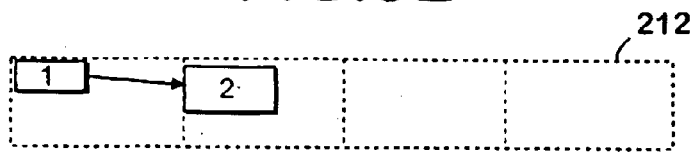
Figure 3G:
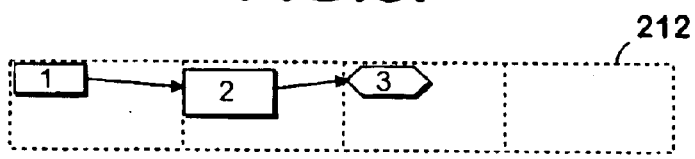
Figure 3H:
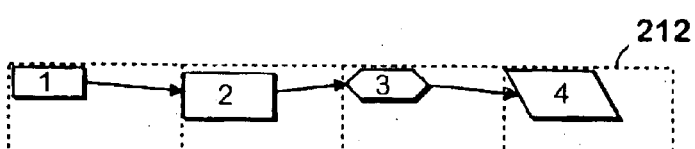
Figure 3I:
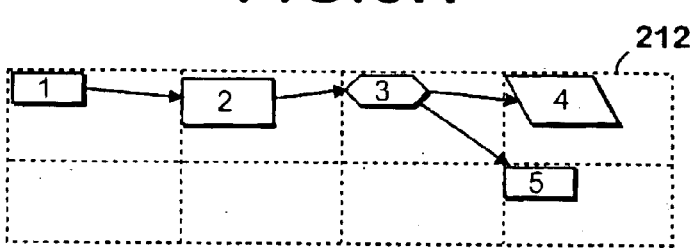
Figure 3J:
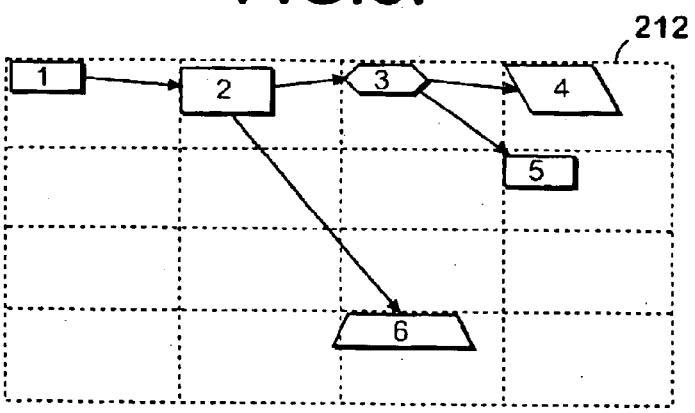
Figure 3K:
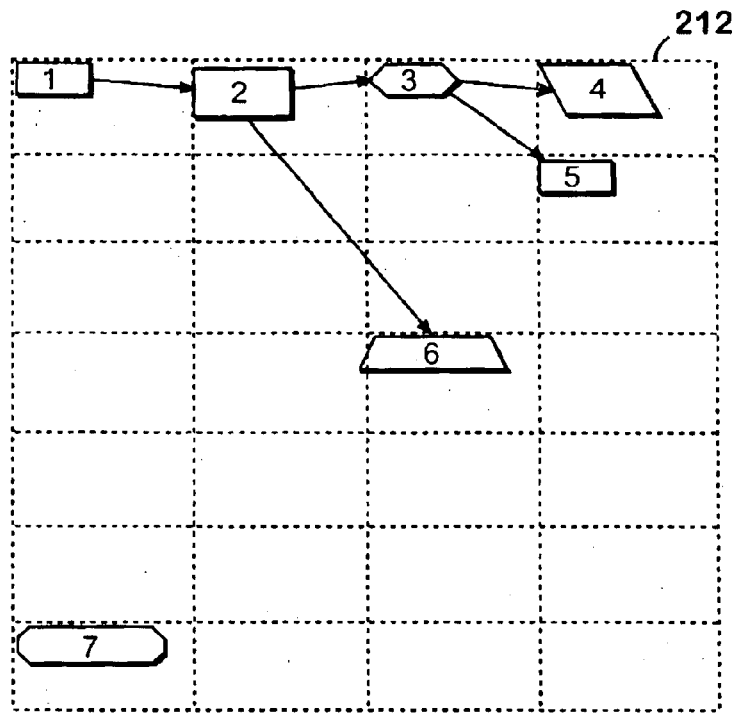
Figure 3L:
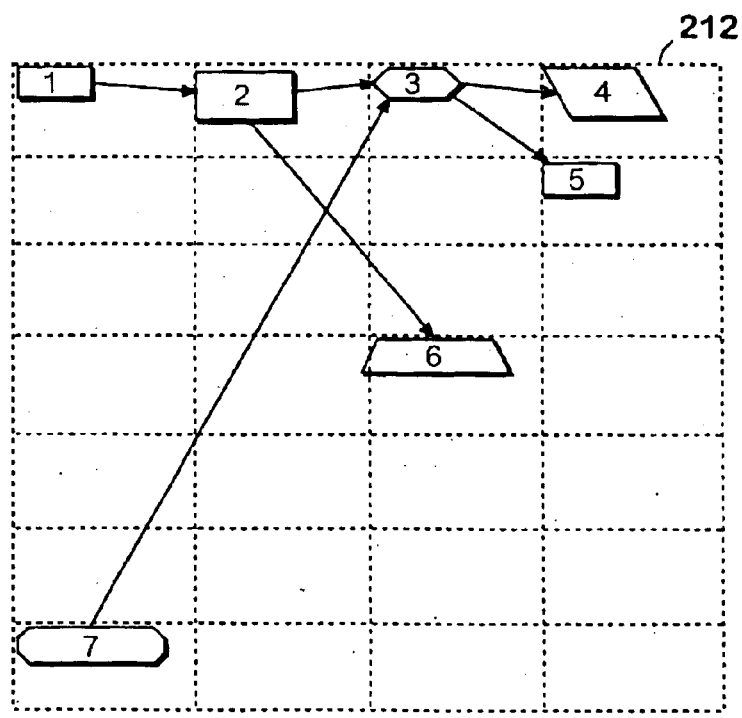
Figure 3M:
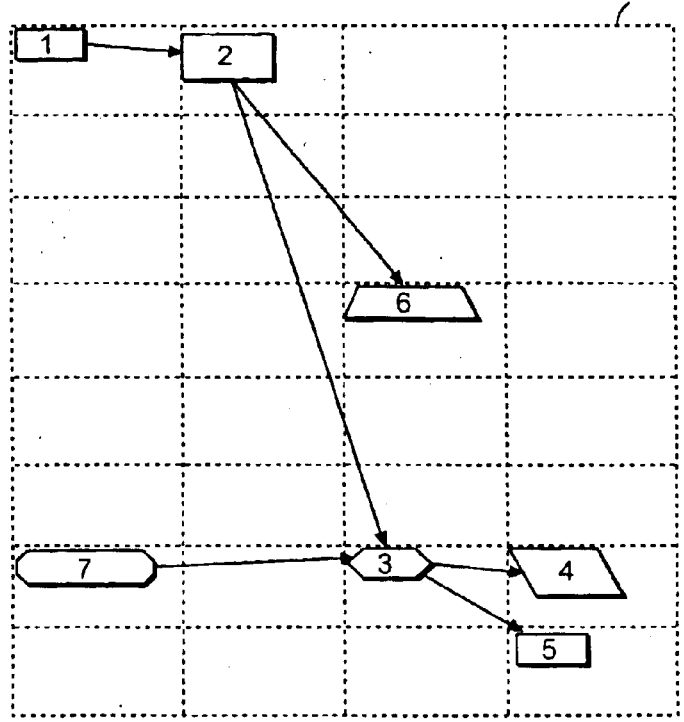
Figure 3N:
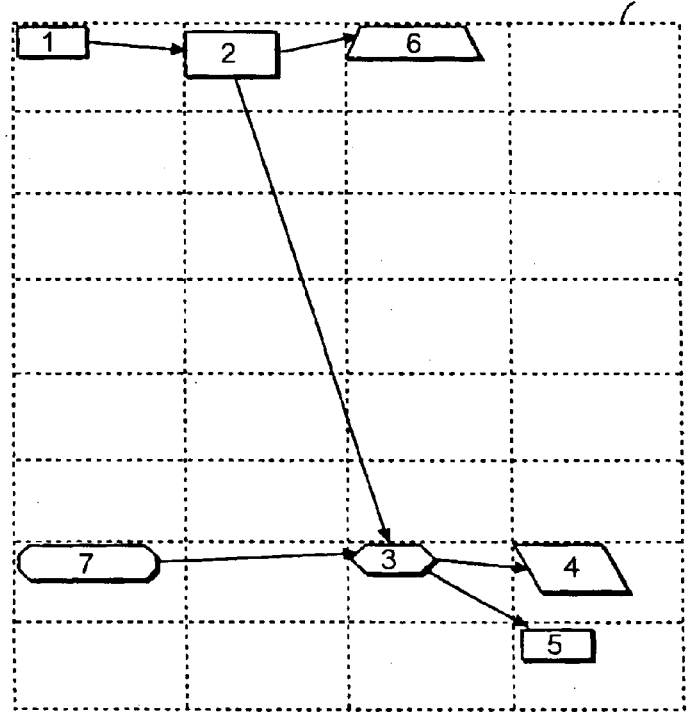
Figure 3O:
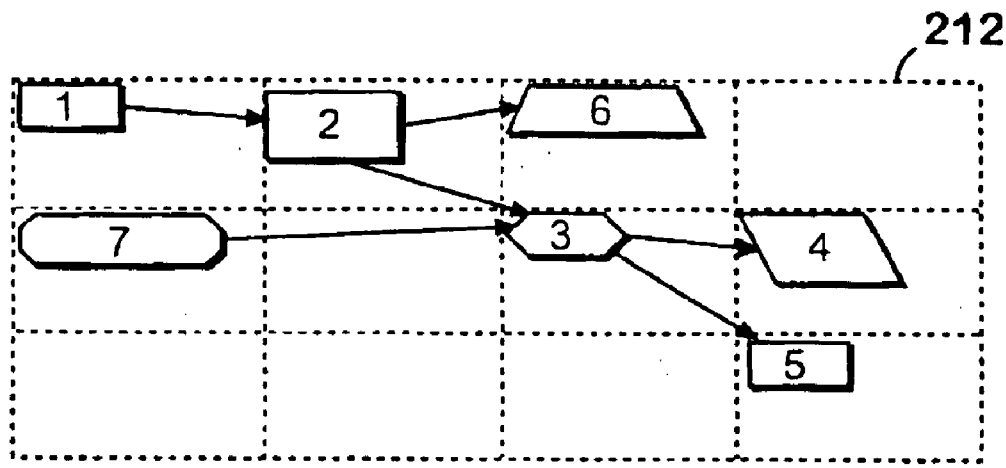
Figure 3P:
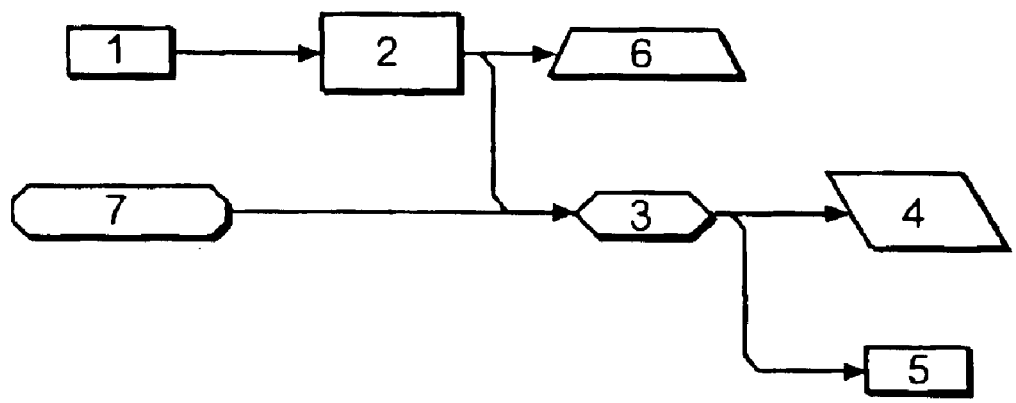

In routine 340, the absolute positions of the nodes in the virtual grid 212 of FIG. 3O are mapped to the actual screen coordinates for a display device. During this step, layout formatting is also applied if any such formatting is selected by the user. Layout formatting can include various parameters such as the formatting for each individual node, spacing between node chains, and adjustments for any page breaks. As mentioned previously, the present invention also adjusts the layout of a network diagram due to customization of individual nodes. For example, the present invention adjusts the layout of a network diagram due to customization of shapes and sizes for specific nodes.

Figure 11:
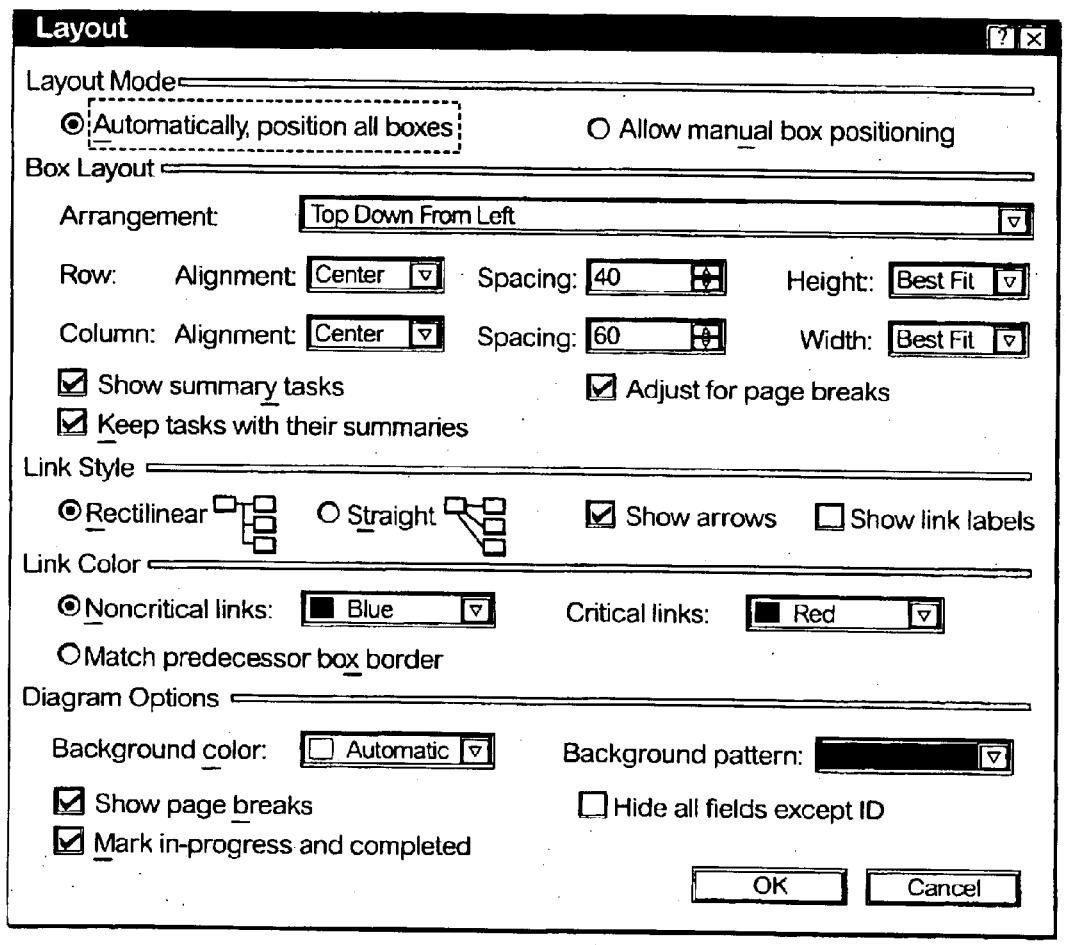
FIG. 11 illustrates an exemplary dialog box for obtaining layout options for network diagrams of the present invention.

The layout formatting for the network diagram can include many parameters. Referring briefly to FIG. 11, this figure illustrates a dialog box 1100 that contains the various options that can be selected for the layout of a particular network diagram. For example, layout formatting can include, but is not limited to, an indication to automatically position all nodes within the diagram, an indication to allow manual box positioning by user, the spatial arrangement of nodes within an entire network diagram such as top down from left, top down by day, top down by week, top down by month, etc.; the alignment of rows and columns can also be adjusted in addition to the spacing between rows and columns; the height and width of rows and columns can also be adjusted. Further, other parameters include an indication whether or not to show summary tasks, always positioning tasks in relation to their summaries (rather than their predecessors, when there is a choice of the two), adjusting for page breaks, specifying a particular link style, showing page, breaks, and selecting background patterns of the network diagram just to name a few exemplary parameters. Now, referring back to FIG. 3C, in step 350, the plurality of nodes are displayed with their corresponding links.

ILLUSTRATIVE EXAMPLE TRACKING NODE POSITIONS PROCESSED IN MEMORY

FIG. 3D illustrates an overview of the computer-implemented process for routine 310 of FIG. 3C which determines the relative row and absolute column positions in addition to creating the preliminary layout structure. The overview of routine 310 begins in step 310A in which each parent node and primary successor nodes along a node chain of a respective parent are processed until all nodes in a particular parents' chain are processed. To provide some context to step 310A, reference will be made to FIGS. 3E–3P. FIGS. 3E–3P illustrate an exemplary layout process for manipulating project data, such as the work data set forth in Table 200B in FIG. 2A, to produce the network diagram of FIG. 2B. The virtual grid 212 is a graphical illustration of the type of data that one or more variables can track to determine relative node positions that are a function of the successor relationships between nodes. The virtual grid 212 may represent how a plurality of variables in memory can keep track of the relative positions of nodes within respective node chains. Virtual grid 212 can represent the spatial relationship between nodes that the plurality of variables such as an array or any equivalent memory structure thereof can monitor.

Referring now to FIG. 3E, a virtual grid 212 contains the first top-level node of the exemplary work or project data as set forth in Table 200B of FIG. 2A. In accordance, with step 310A, each parent node and primary successor nodes along a node chain of the parent are processed until all nodes in a parents' chain are processed. Therefore, the first successor of task 1, which is task 2 according to Table 200B of FIG. 2A, is processed. See FIG. 3F. Since task 2 has a successor, this successor (task 3) is also processed. See FIG. 3G. Task 3 does have a further successor node and thus task 4 is processed as illustrated in FIG. 3H. Step 310A ends since task 4 does not have any further successor nodes.

In step 310B, each most recently processed parent node in a respective node chain is located and secondary successor nodes in a respective chain of a respective recently processed parent node are then processed or positioned. This means that starting from task 4, the most recently processed parent node is task 3. It is determined that task 3 has a secondary successor of task 5. Task 5 is then positioned within the virtual grid 212 as illustrated in FIG. 3I. In accordance with step 310B, and the next successor of task 5 is examined. Since task 5 does not have any successor nodes as set forth in Table 200B of FIG. 2A, then the process in step 310B continues to step 310C. Step 310C states that step 310B is repeated as necessary depending upon the number of parent nodes in a respective node chain. Therefore, the process flows from task 5 to its parent of task 3 where it is determined that further successor nodes do not exist for the parent node task 3. This process then continues to the next parent task which is task 2. Task 2 has a secondary successor node of task 6. Task 6 is then positioned within the virtual grid 212 in accordance with the next available row for a child task. See FIG. 3J. Since task 6 does not contain any successor nodes as set forth in Table 200B of FIG. 2A, the process returns to top level task 1 in which it is determined whether any other successor nodes exists for this task.

Since the top level node of task 1 is reached, the process continues to step 310D in which the next node chain is processed taking into account any relationships with previous node chains. That is, the next top level node, task 7, is examined. Task 7 is then positioned within virtual grid 212 in accordance with step 310D. See FIG. 3K. The process then continues to subsequent successor nodes where the second node chain is established.

The overview process illustrated in FIG. 310D is intended to only provide a high-level summary of how each node in its corresponding relationships are evaluated. Further details of FIGS. 3E–3P will be understood when reviewed in light of the Mapping of Variables in Table 1. The present invention tracks many more relationships between nodes then is depicted by the flow chart of FIG. 3D. FIG. 3D provides a general framework of the sequence in which relationships between nodes are evaluated. Further details of the relationships between nodes that are tracked by the present invention will become apparent from the description of the detailed and exemplary computer-implemented processes illustrated in FIGS. 4–10.

DETAILED EXEMPLARY PROGRAMMING ALGORITHM FOR THE PRESENT INVENTION

Figure 4:
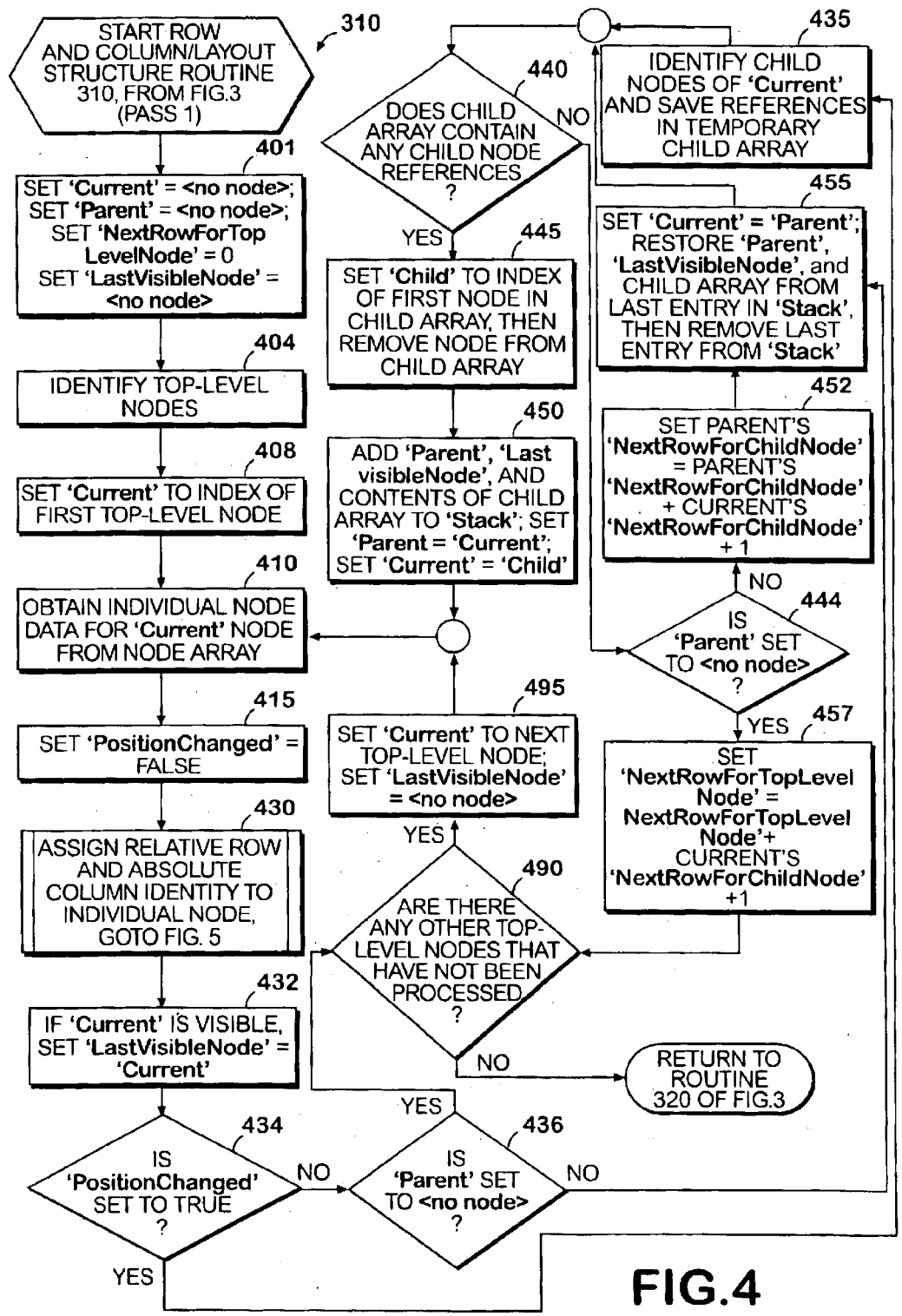
FIG. 4 is a logic flow diagram illustrating the relative row and absolute column/create preliminary layout structure routine of FIG. 3C.

Referring now to FIG. 4, this Fig. illustrates the detailed computer-implemented process for routine 310 which determines the relative row and absolute column positions of each node to create a preliminary layout structure. Routine 310 begins in step 401 in which the variables "Current", "Parent", "NextRowForTopLevelNode", and "LastVisibleNode" are initialized. In step 404, the top-level nodes of the node array 307 are determined by looking at the dependency information such as the node successor information listed in column 203 of FIG. 2A. In step 408, the variable "Current" is set equal to the first top-level node. In step 410, individual node data for the "Current" node is obtained from the node array 307 as illustrated in FIGS. 3A and 3B.

In step 415, the variable "PositionChanged" is set equal to the value of false. This flag set in step 415 can be used to indicate whether the position of the "Current" node has been modified in step 430, discussed below. Next, in routine 430, the "Current" node being examined in the present iteration is assigned a relative row and column identity. Further details of routine 430 will be discussed below with reference to FIG. 5.

In step 432, it is determined whether the "Current" node being examined in the present iteration is visible. In step 432, processing is starting for the children of "Current" and if "Current" is visible, then "Current" is the closest visible ancestor of its children. If the "Current" node being examined is visible, then the variable "LastVisibleNode" is set equal to the value of "Current". Next, in decision step 434, it is determined whether the variable "PositionChanged" is set equal to the value of true. Step 434, can check whether the position of the node has been modified in step 430, because if it hasn't, then its children do not need to be processed. If the inquiry to decision step 434 is negative, then the "No" branch is followed to decision step 436 in which it is determined whether the variable "Parent" is set equal to the value of "No Node". The value "No Node" usually indicates that a particular node is a top level node, as defined above. In other words, a top level node is a node that does not have any parents.

If the inquiry to decision step 436 is positive, then the "Yes" branch is followed to decision step 490 in which it is determined if there are any other top-level nodes that have not been processed. If the inquiry to decision step 436 is negative, the "No" branch is followed to step 455, discussed in further detail below. If the inquiry to decision step 434 is positive, then the "Yes" branch is followed to step 435. In step 435, the child nodes of the "Current" node being examined are identified. The references to the child nodes are then saved in the temporary child array.

Next, in decision step 440, it is determined whether the child array contains any child node references. Step 440 checks whether "Current" has other descendents that still need to be processed. If the inquiry to decision step 440 is negative, then the "No" branch is followed to decision step 444 in which it is determined whether the variable "Parent" is set equal to the value of "No Node". Step 444 is reached when all descendents of "Current" have been processed and it checks whether "Current" is a top-level node. If the inquiry to decision step 440 is positive, then the "Yes" branch is followed to step 445 in which the variable "Child" is set equal to the index of the first node in the child array. Also in this step, the reference to the child node which is now set equal to the variable "Child" is then removed from the child array. Subsequently, in step 450, the values of the variables "Parent", "LastVisibleNode", and the contents of the child array are stored together into the "Stack" variable. In other words, step 450 saves the current state information on the stack and starts processing the first child in array. The state needs to be saved because the algorithm proceeds in depth-first order, recursively processing all descendents of a child before moving on to other children in this exemplary embodiment. The variable "Parent" is then set equal to the value of the "Current" variable. The value of the "Current" variable is then set equal to the value of the "Child" variable. The process then proceeds back to step 410.

In decision step 444, as noted above, it is determined whether the variable "Parent" is set equal to the value of "No Node". If the inquiry to decision step 444 is positive, then the "Yes" branch is followed to step 457. In step 457, the variable "NextRowForTopLevelNode" is set equal to its current value plus the value of the variable "NextRowForChildNode" plus one. Step 457 determines the next row to use for positioning the next top-level node. The process then proceeds to decision step 490. If the inquiry to decision step 490 is positive, then the "Yes" branch is followed to step 495 in which the variable "Current" is set equal to the next top level node. In other words, the process moves to the next top-level node (i.e., the next chain). The variable "LastVisibleNode" is then set equal to the value of "No Node". The process then proceeds back to step 410.

If the inquiry to decision step 444 is negative, then the "No" branch is followed to step 452. In step 452, the variable "NextRowForChildNode" of the parent of the "Current" node is set equal to the value of the parent's "NextRowForChildNode" value plus the "Current" node's "NextRowForChildNode" value plus one. Step 452 determines the next row to use for positioning the next child (if any) of "Parent." Next, in step 455, the "Current" variable is set equal to the value of the "Parent" variable. Then, the values of the "Parent", "LastVisibleNode", and the contents of the child array are restored from the last entries in the "Stack" variable. The last entry from the "Stack" is then removed. Basically, step 455 returns to processing the other children of "Parent." The process then proceeds to decision step 440.

Figure 5:
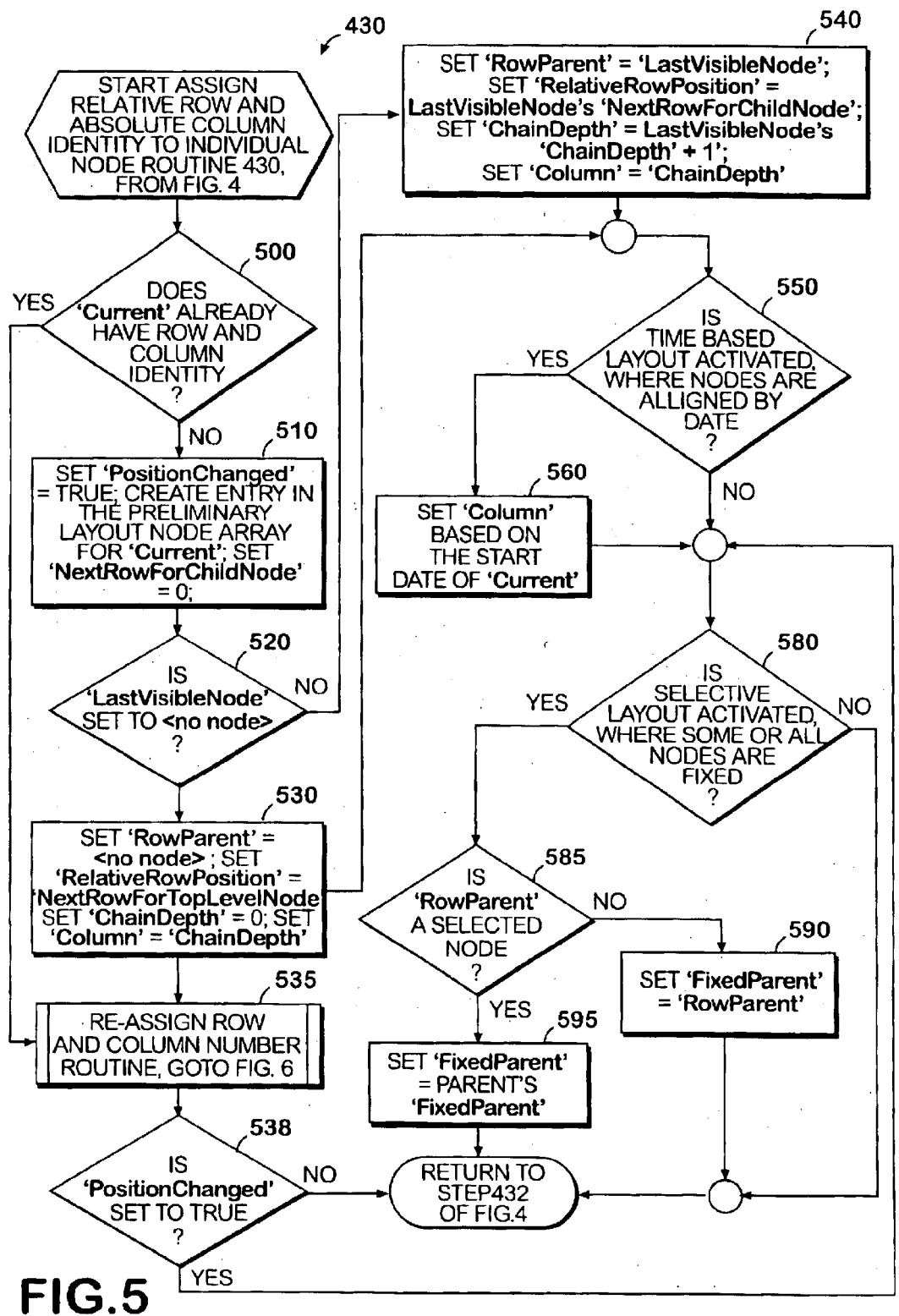
FIG. 5 illustrates the assign relative row and absolute column identity routine as set forth in FIG. 4.

Referring now to FIG. 5, this Fig. illustrates another detailed exemplary computer-implemented process for assigning the relative row and column identity as set forth in Routine 430 of FIG. 4. Routine 430 begins with decision step 500 in which it is determined whether the "Current" node being examined already has a row and column identity in the virtual memory grid 212. In other words, step 500 checks whether the node has been previously positioned. If the inquiry to decision step 500 is negative, then the "No" branch is followed to step 510 in which the variable "PositionChanged" is set equal to the value of true. Then, an entry is created in the preliminary layout node array 315 for the "Current" node, as step 510 is where the preliminary layout node array entries get added. The variable "NextRowForChildNode" is set equal to the value of zero.

If the inquiry to decision step 500 is positive, then the "Yes" branch, is followed to: Routine 535 in which the row and column number of the "Current" node is reassigned. Further details of Routine 535 will be discussed with respect to FIG. 6 below.

After Routine 535, in decision step 538 it is determined whether the variable "PositionChanged" is set equal to the value of "True." If the inquiry to decision step 538 is negative, then the "No" branch is followed in which the process returns to step 432 of FIG. 4. If the inquiry to decision to step 538 is positive, then the "Yes" branch is followed to decision step 580 (which will be discussed below). Referring back to step 510, after this step, the process proceeds to decision step 520 in which it is determined whether the variable "LastVisibleNode" is set equal to the value of "No Node." Basically, step 520 checks whether "Current" is the first visible node in the chain. If the inquiry to decision step 520 is negative, then the "No" branch is followed to step 540. In step 540, the variable "RowParent" is set equal to the value of the variable "LastVisibleNode." The variable "RelativeRowPosition" is then set equal to the value of the last visible node's variable "NextRowForChildNode." Next, the variable "ChainDepth" for the "Current" node is set equal to the value of the last visible node's "ChainDepth" plus one. Then, the variable "Column" is set equal to the value of the variable "ChainDepth."

If the inquiry to decision step 520 is positive, then the "Yes" branch is followed to step 530 in which the variable "RowParent" for the "Current" node is set equal to the value of "No Node." Next, the variable "RelativeRowPosition" is :set equal to the value of the variable "NextRowForTopLevelNode." The variable "ChainDepth" is then set equal to zero. The variable "Column" is set equal to the value of the variable "ChainDepth" for the "Current" node.

Next, in decision step 550, it is determined whether a time based layout has been activated where all the nodes are aligned by the start dates of the tasks. If the inquiry to decision step 550 is positive, then the "Yes" branch is followed to step 560 in which the variable "Column" is set equal to the column that corresponds to the date range that encompasses the start date of the "Current" node. If the inquiry to decision step 550 is negative, then the "No" branch is followed to decision step 580 in which it is determined whether a selective layout has been activated where some or all the nodes are fixed. Selective layout, as noted above, is an optional layout in which a user can select certain nodes that should not be automatically positioned by the present invention. That is, a user can select certain nodes that remain in a fixed position within a network diagram while other nodes that are not selected can be adjusted automatically with the present invention.

If the inquiry to decision step 580 is negative, then the "No" branch is followed in which the process returns to step 432 of FIG. 4. If the inquiry to decision step 580 is positive, then the "Yes" branch is followed to decision step 585 in which it is determined whether the node currently specified in the variable "RowParent" is a selected node. If the inquiry to decision step 585 is negative, then the "No" branch is followed to step 590 in which the variable "FixedParent" is set equal to the value of the variable "RowParent." If the inquiry to decision step 585 is positive, then the "Yes" branch is followed to step 595 in which the variable "FixedParent" is set equal to the value of the parent's "FixedParent" variable. The process then returns to step 432 of FIG. 4.

Figure 6:
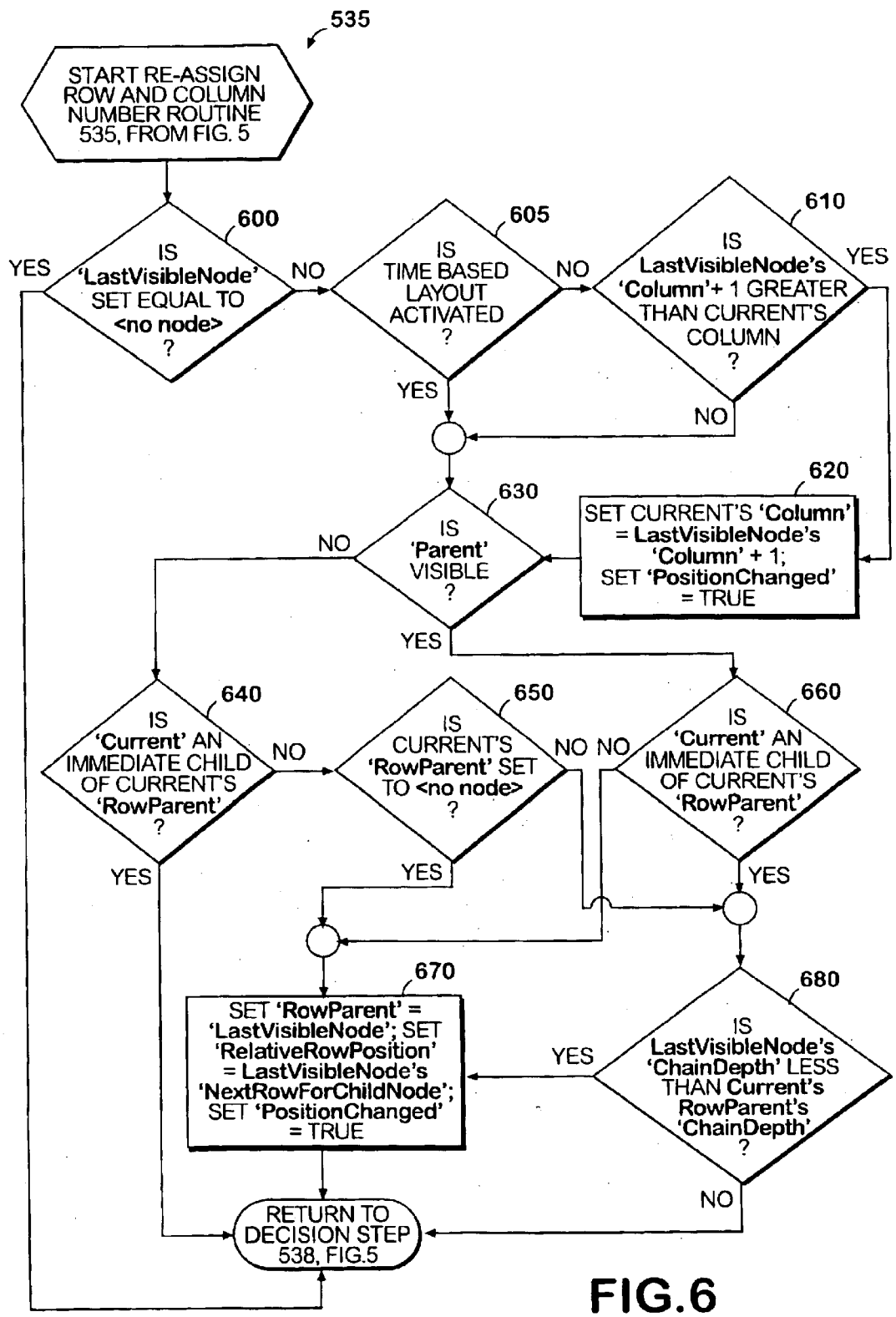
FIG. 6 is a logic flow diagram illustrating the re-assign relative row and absolute column number routine as set forth in FIG. 5.

FIG. 6 illustrates another detailed exemplary computer-implemented process for Routine 535 of FIG. 5 in which the row and column for a "Current" node is reassigned. Routine 510 as illustrated in FIG. 6 starts with decision step 600. In decision step 600, it is determined whether the value of the variable "LastVisibleNode." is set equal to the value of "No Node." Step 600 checks whether "Current" is the first visible node in the chain. If the inquiry to decision step 600 is positive, then the "Yes" branch is followed in which the process returns to decision step 538 of FIG. 5. If the inquiry to decision step 600 is negative, then the "No" branch is followed to decision step 605 in which it is determined whether a time based layout has been activated. If the inquiry to decision step 605 is negative, then the "No" branch is followed to decision step 610. If the inquiry to decision step 605 is positive, then the "Yes" branch is followed to decision step 630.

In decision step 610, it is determined whether the value of the last visible node's "Column" plus 1 is greater than the "Current" node's value for its "Column" variable. Step 610 checks whether the column value must be updated in order to position the node to the right of all of its parents. If the inquiry to decision step 610 is negative, then the "No" branch is followed to decision step 630. If the inquiry to decision step, 610 is positive, then the "Yes" branch is followed to step 620. In step 620, the variable "Column" of the "Current" node is set equal to the value of the last visible node's "Column" plus 1. The variable "PositionChanged" is then set equal to true. Step 620 repositions the node so it is to the right of its "Parent" that's currently being processed.

Next, in decision step 630, it is determined whether the "Parent" node is visible. If the inquiry to decision step 630 is negative, then the "No" branch is followed to decision step 640. If the inquiry to decision step 630 is positive, then the "Yes" branch is followed to decision step 660. If there is more than one visible ancestor, steps 630, 640, and 660 make sure "Current" is positioned in respect to a visible parent (i.e. an immediate ancestor), if one exists.

In decision step 640, it is determined whether the "Current" node is an immediate child of the "Current" node's "RowParent." If the inquiry to decision step 640 is positive, then the "Yes" branch is followed in which the process returns to decision step 538 at FIG. 5. If the inquiry to decision step 640 is negative, then the "No" branch is followed to decision step 650.

In decision step 650, it is determined whether the "Current" node's "RowParent" is set equal to the value of "No Node." Both steps 600 and 650 make sure "Current" is positioned in respect to a visible ancestor, if one exists. If no visible ancestor exists, "Current" will be positioned as a top-level node. If the inquiry to decision step 650 is negative, then the "No" branch is followed to decision step 680. If the inquiry to decision step 650 is positive, then the "Yes" branch is followed to step 670. Referring to decision step 660, in this step it is determined whether the "Current" node is an immediate child of the "Current" node's "RowParent." If the inquiry to decision step 660 is positive, then the "Yes" branch is followed to decision step 680. If the inquiry to decision step 660 is negative, then the "No" branch is followed to step 670.

In step 670, the variable "RowParent" is set equal to the value of the variable "LastVisibleNode." Then, the variable "RelativeRowPosition" is set equal to the value of the last visible node's "NextRowForChildNode." Then, the variable "PositionChanged" is set equal to the value of "True." The process then proceeds back to decision step 538 at FIG. 5.

Referring now to decision step 680, it is determined whether the last visible node's "ChainDepth" is less than the value of the current node's row parent's "ChainDepth." If a decision was not made about the "RowParent" in steps 630–660, then the decision is made based on the shortest visible chain. If the inquiry to decision step 680 is positive, then the "Yes" branch is followed to step 670. If the inquiry to decision step 680 is negative, then the "No" branch is followed in which the process returns to decision step 538 at FIG. 5. Basically, in steps 600, 630, 640, 650, 660, and 680, the checks are determining whether "Parent" is the new "RowParent" of "Current."

Figure 7:
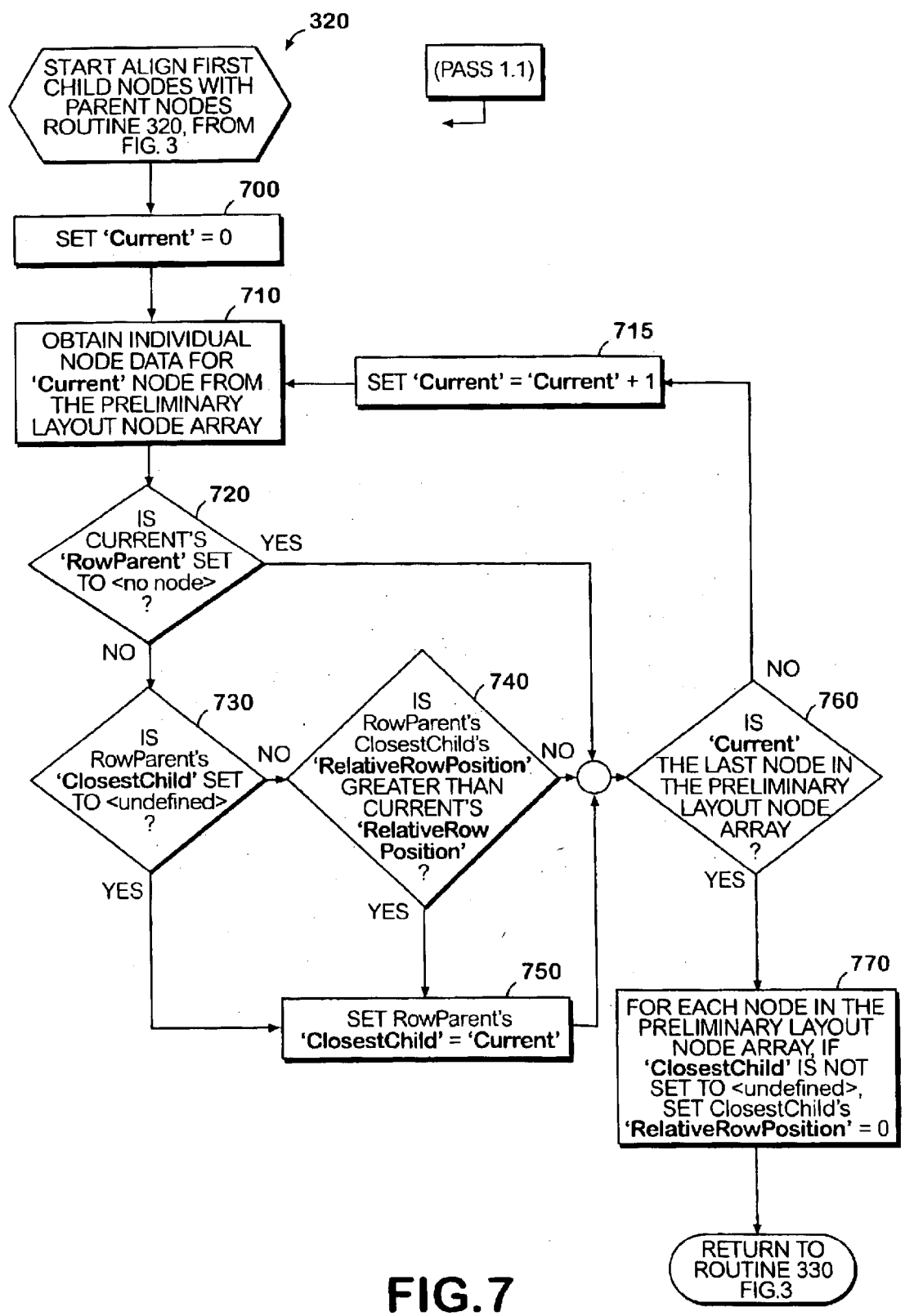
FIG. 7 is a logic flow diagram illustrating an exemplary routine for aligning children nodes with parent nodes as set forth in FIG. 3.

Turning now to FIG. 7, another detailed exemplary computer-implemented process for routine 320 of FIG. 3 is illustrated. Routine 320 aligns the first child nodes with their corresponding parent nodes. Routine 320 begins with step 700 in which the variable "Current" is set equal to a value of zero. Step 700 sets "Current" to the first element in the preliminary layout node array. Next, in step 710 individual node data for the "Current" node is obtained from the preliminary layout node array.

In decision step 720 it is determined whether the "Current" node's "RowParent" is set equal to a value of "No Node." Step 720 determines whether "Current" is the first (or first visible) node in its chain. If the inquiry to decision step 720 is positive, then the "Yes" branch is followed to decision step 760. If the inquiry to decision step 720 is negative, then the "No" branch is followed to decision step 730.

In decision step 730 it is determined whether the "Current" row parent's variable "ClosestChild" is set equal to a value of "Undefined." Step 730 is checking whether any children of "RowParent" have been encountered. If the inquiry to decision step 730 is positive, then the "Yes" branch is followed to step 750. If the inquiry to decision step 730 is no, then the "No" branch is followed to decision step 740.

In decision step 740 it is determined whether the row parent's closest child's RelativeRowPosition" variable is greater than the "Current" node's "RelativeRowPosition." If the inquiry to decision step 740 is positive, then the "Yes" branch is followed to step 750 in which the row parent's variable "ClosestChild" is set equal to the value of the "Current" variable. The assignment in step 750 indicates that "Current" is the closest child of "RowParent" so far. If the inquiry to decision step 740 is negative, then the "No" branch is followed to decision step 760.

In decision step 760, it is determined whether the "Current" node is the last node in the preliminary layout node array. If the inquiry to decision step 760 is negative, then the "No" branch is followed to step 715 in which the value of the variable "Current" is set equal to its existing value plus one. Step 715 sets "Current" to the next node in the preliminary layout node array. If the inquiry to decision step 760 is positive, then the "Yes" branch is followed to step 770.

In step 770, for each node in the preliminary layout node array, if the value of the variable "ClosestChild" is not set equal to the value of "Undefined", then the closest child node's variable "RelativeRowPosition" is set equal to the value of zero. Step 770 moves the closest child node of each parent node to the same row as the parent. The process then returns to Routine 330 of FIG. 3.

Figure 8A:
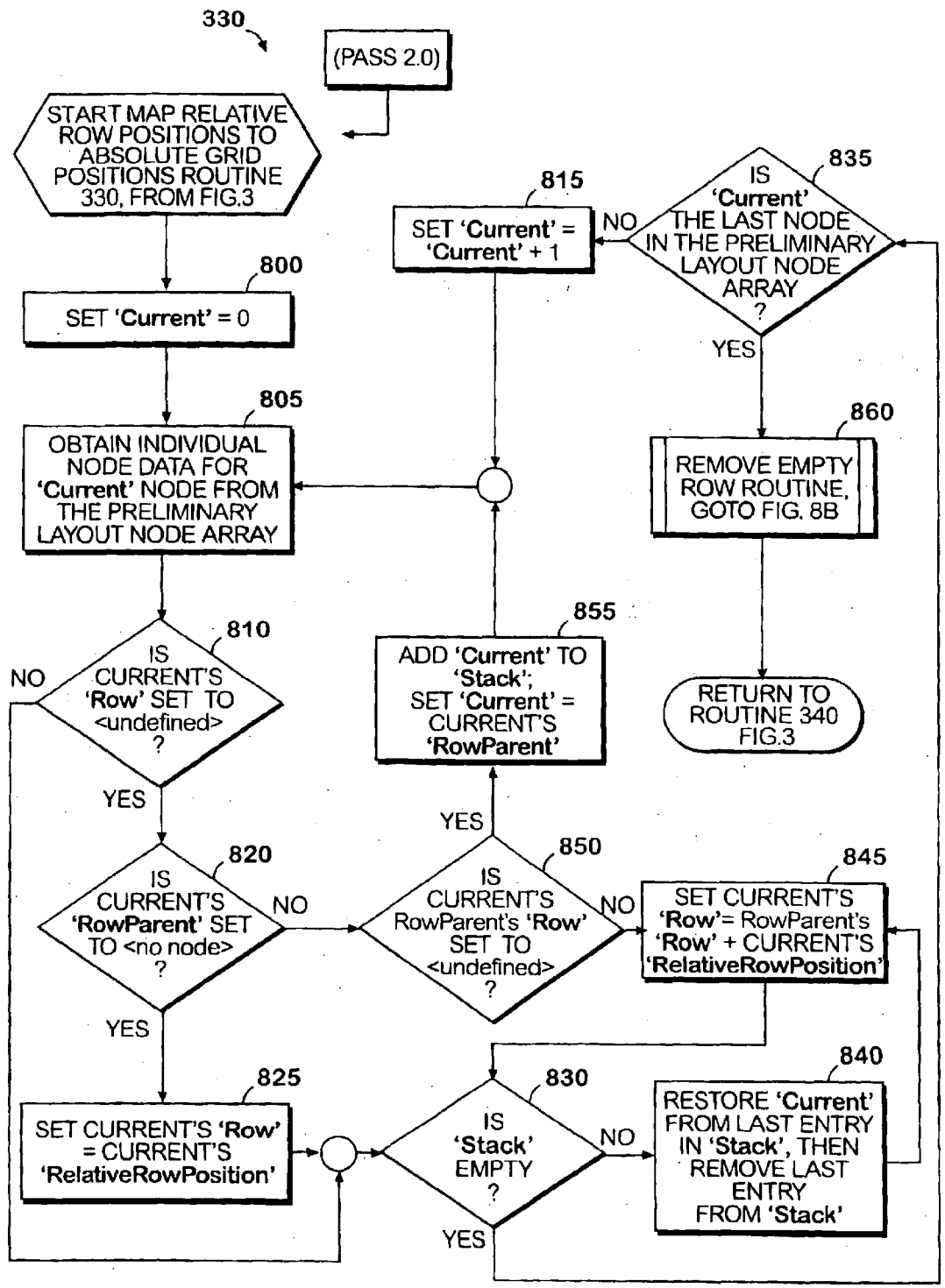
FIG. 8A is a logic flow diagram illustrating an exemplary routine for mapping relative offsets to absolute grid positions as set forth in FIG. 3C.

FIG. 8A illustrates the computer-implemented process for Routine 330 of FIG. 3. Routine 330 maps the relative row positions of the nodes to absolute positions of a grid (not shown). Routine 330 begins with step 800 in which the variable "Current" is set equal to the value of zero. Step 800 sets "Current" to the first element in the preliminary layout node array. Next, in step 805, individual node data for the "Current" node is obtained from the preliminary layout node array. In decision step 810, it is determined whether the "Current" node's "Row" is set equal to a value of "Undefined." Step 810, is checking whether the "Current" node has been processed by this pass before. If the inquiry to decision step 810 is negative, then the "No" branch is followed to decision step 830. If the inquiry to decision step 810 is positive, then the "Yes" branch is followed to decision step 820.

In decision step 820 it is determined whether the "Current" node's "RowParent" variable is set equal to the value of "no node." The check in step 820 indicates whether "Current" is the first (or first visible) node in its chain. If the inquiry to decision step 820 is positive, then the "Yes" branch is followed to step 825. If the inquiry to decision step 820 is negative, then the "No" branch is followed to decision step 850. In step 825, the "Current" node's "Row" is set equal to the "Current" node's "RelativeRowPosition." Step 825 is reached because "Current" is a top-level node, so Current's absolute row position is set to it's relative row position, because they are the same for top-level nodes. In decision step 850, it is determined whether the "Current" node's row parent's "Row" is set equal to a value of "undefined." Step 850 is checking whether the "RowParent" of the "Current" node has been processed by this pass before.

If the inquiry to decision step 850 is positive, then the "Yes" branch is followed to step 855 in which the variable "Current" is added to the "Stack" variable. The variable "Current" is then set equal to the "Current" node's "RowParent." Step 855 saves "Current" and starts processing its "RowParent" instead. The process then proceeds back to step 805.

If the inquiry to decision step 850 is negative, then the "No" branch is followed to step 845. In step 845, the "Current" node's "Row" is set equal to the row parent's "Row" plus the value of the "Current" node's "RelativeRowPosition." Basically, step 845 computes Current's absolute row position.

Next, in decision step 830 it is determined whether the "Stack" variable is empty. If the stack is empty in step 830, it means the entire chain has been processed. If the inquiry to decision step 830 is negative, then the "No" branch is followed to step 840. In step 840, the variable "Current" is restored from the last entry in the "Stack" variable. Then, the last entry is removed from the "Stack" variable. Step 840 goes back to processing a child of "Current" (that was put on hold earlier). The process then proceeds back to step 845.

If the inquiry to decision step. 830 is positive, then the "Yes" branch is followed to decision step 835 in which it is determined whether the "Current" node is the last node in the preliminary layout node array. Step 835 check whether all nodes in all chains have been processed. If the inquiry to decision step 835 is negative, then the "No" branch is followed to step 815 in which the variable "Current" is set equal to its existing value plus one. Step 815 sets "Current" to the next node in the preliminary layout node array. If the inquiry to decision step 835 is positive, then the "Yes" branch is followed to Routine 860 in which the empty rows are removed from the virtual grid 212. The process then returns to Routine 340 of FIG. 3.

Figure 8B:
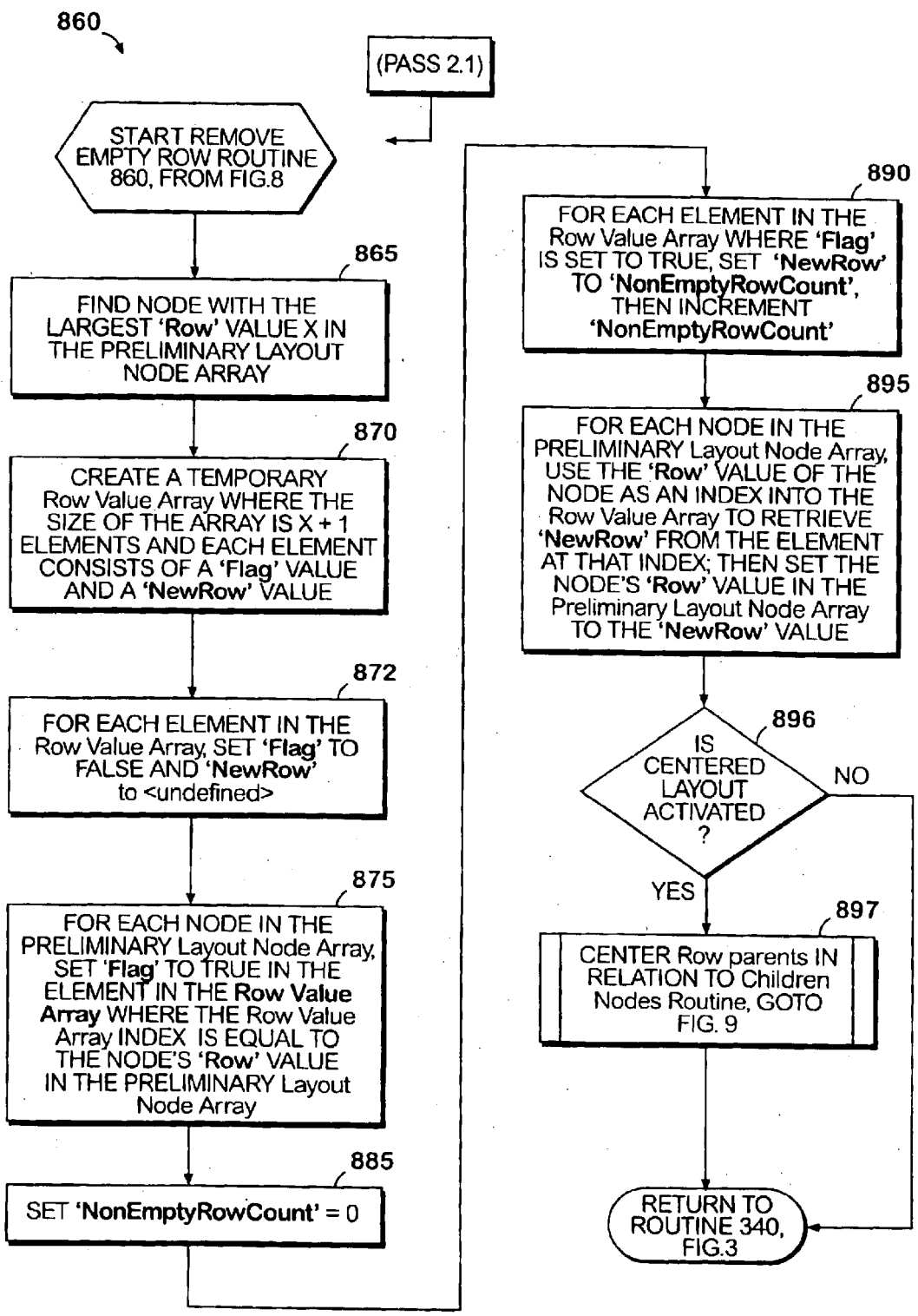
FIG. 8B is a logic flow diagram illustrating the remove empty row routine of FIG. 8A.

Referring now to FIG. 8B, this Fig. illustrates the computer-implemented process for Routine 860 of FIG. 8A. Routine 860 is designed to remove the empty rows between nodes. Routine 860 begins with step 865 in which the node with the largest "Row" value in the preliminary layout node array is located. Next, in step 870, a temporary row value array is created where the size of the array has a number of elements that exceeds the largest "Row" value by one. Each element in the temporary row array is comprised of a "Flag" value and a "New Row" value.

In step 872, for each element in the row value array, the variable "Flag" is initialized to a value of "False" and the variable "NewRow" is initialized to a value of "Undefined." In step 875, for each node in the preliminary layout node array, the variable "Flag" is set equal to a value of "True" in the element in the row value array where the row value array index is equal to the node's "Row" value in the preliminary layout node array. Next, in step 885, the variable "NonEmptyRowCount" is initialized to a value of zero.

In step 890, for each element in the row value array where the variable "Flag" is set equal to a value of "True" the variable "NewRow" is set equal to the corresponding value of the "NonEmptyRowCount" variable value. Basically step 890, renumbers the non-empty rows in the row value array.

Then, the "NonEmptyRowCount" variable for each corresponding node is incremented by one.

In step 895, for each node in the preliminary layout node array, a "NewRow" value is retrieved from the element in the row value array indexed by the node's "Row" value in the preliminary layout node array. The "Row" value in the preliminary layout node array is then set equal to the value of the retrieved "NewRow" variable value. Basically step 895 assigns the new row numbers computed in step 890 to each node.

In decision step 896, it is determined whether a centered layout option has been selected or activated. If the inquiry to decision step 896 is positive, then the "Yes" branch is followed to Routine 897 in which the row parents are centered in relation to their children. Further details of Routine 897 will be discussed below with respect to FIG. 9. If the inquiry to decision step 896 is negative, then the "No" branch is followed in which the process returns to Routine 340 of FIG. 3.

Figure 9:
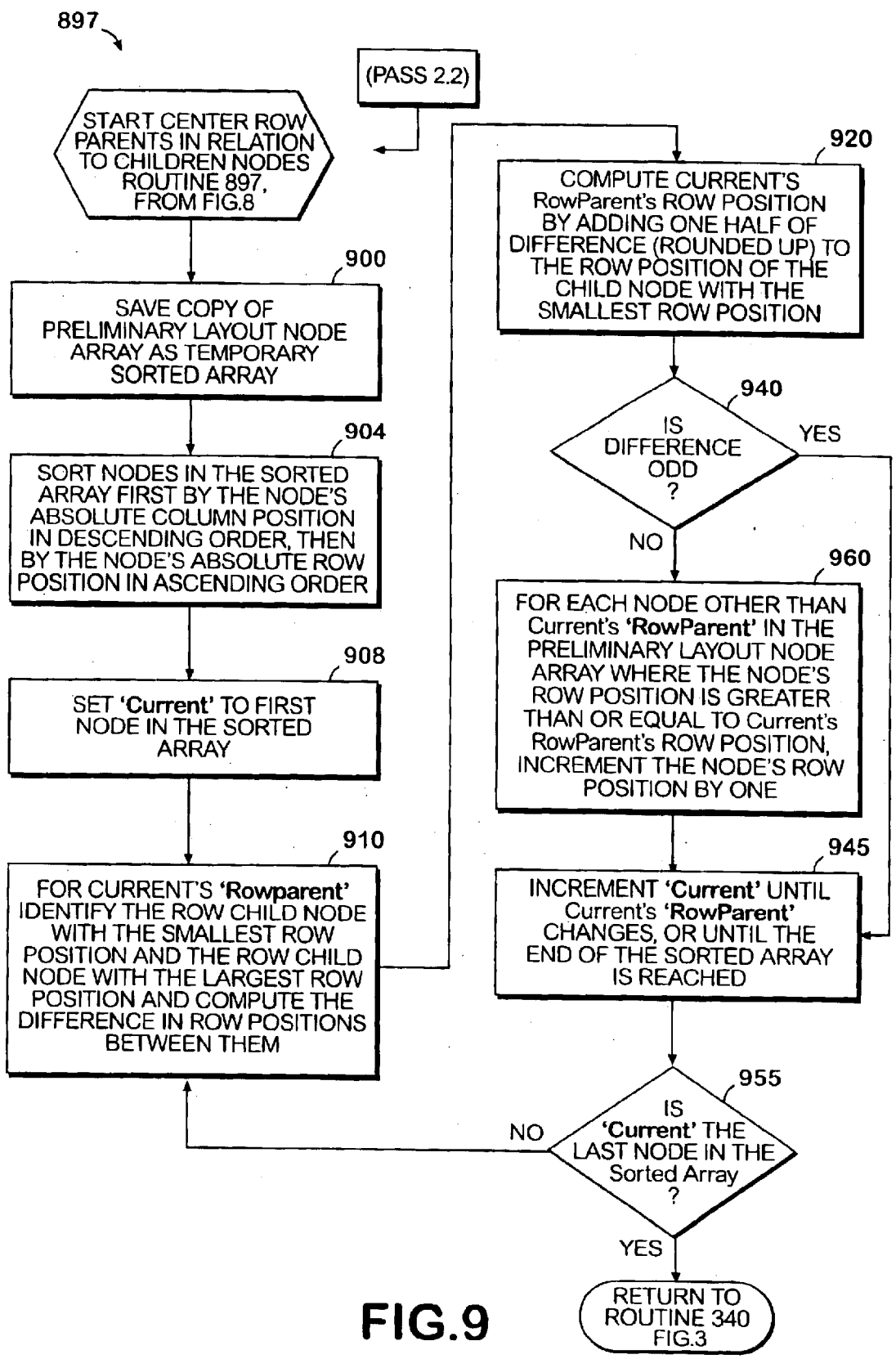
FIG. 9 is a logic flow diagram illustrating an exemplary routine for centering node parents in relation to children nodes as set forth in FIG. 8.

Referring to FIG. 9, this figure illustrates the computer-implemented process for routine 897 illustrated in FIG. 8B. Routine 897 centers the row parents in relation to the children nodes to generate a centered layout format that can be selected by a user. Routine 897 begins with step 900 in which a copy of the preliminary layout node array is saved as a temporary sorted array. In step 904, the nodes in the temporary sorted array are organized or sorted by absolute column position in a descending order and then by the nodes' absolute row position in an ascending order within each absolute column position. Step 904 ensures that the array is arranged such that processing will start at the top right corner of the virtual grid and proceed in a top-to-bottom, right-to-left order. In step 908, the variable "Current" is set equal to the first node in the sorted array.

In step 910, for a "Current" node's "RowParent" the row child node with the smallest row position is identified. The row child node with the largest row position for the "Current" node is also identified. Next, the difference in row positions is computed between the row child node with the smallest row position and the row child node with the largest row position. Subsequently, in step 920, the "Current" node's row parent's row position is computed by taking one half of the difference and rounding it up to the next whole number, then adding it to the row position of the child node with the smallest row position. Step 920 positions the "RowParent" at the halfway point in the vertical range of its children.

Next, in decision step 940 it is determined whether the value calculated in step 920 is odd. In other words, step 940 checks whether the "RowParent" is really centered in respect to the vertical range of its children or whether an adjustment needs to be made. If the inquiry to decision step 940 is positive, then the "Yes" branch is followed to step 945. If the inquiry to decision step 940 is negative, then the "No" branch is followed to step 960. In step 960, for each node other than the "Current" node's "RowParent" in the preliminary layout node array where a node's row position is greater than or equal to the "Current" node's row parent's row position, the corresponding node's row position is incremented by one. Step 960, moves all nodes below the halfway point down by one row. In step 945, the variable "Current" is incremented until the "Current" node's "RowParent" changes, or until the end of the sorted array is reached. Step 945 identifies the next "RowParent" node that needs to be centered in respect to the vertical range of its children.

In decision step 955 it is determined whether the "Current" node is the last node in the sorted array. Step 955 checks whether all noes have been centered or it returns to step 910 to position Current's "RowParent." If the inquiry to decision step 955 is negative, then the "No" branch is followed back to step 910. If the inquiry to decision step 955 is positive, then the "Yes" branch is followed in which the process returns to routine 340 of FIG. 3.

Figure 10:
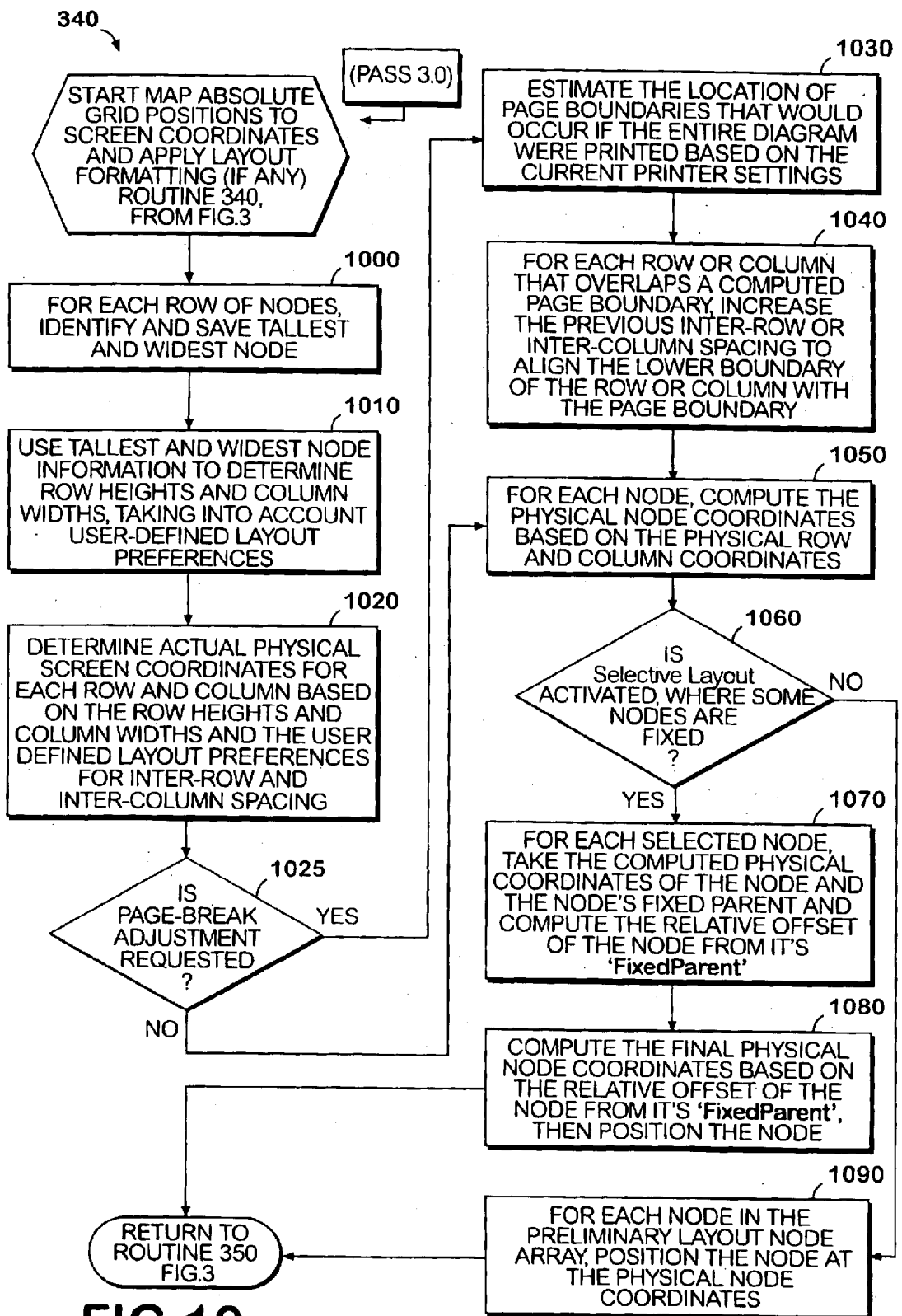
FIG. 10 is a logic flow diagram illustrating an exemplary routine for mapping absolute virtual grid positions to screen coordinates and applying layout formatting as set forth in FIG. 3C.

Referring now to FIG. 10, this figure illustrates an exemplary detailed computer-implemented process for routine 340 of FIG. 3. Routine 340 begins with step 1000 in which the tallest and widest node for each row of the nodes is identified. In step 1010, the tallest and widest node information is used to determine row height and column widths, taking into account any-user-defined layout preferences.

Next, in step 1020, the actual physical screen coordinates for each row and column is determined based on the row heights and column widths and the user-defined layout preferences for inter-row and inter-column spacing selected in the dialog box in FIG. 11. In decision step 1025, it is determined whether a page break adjustment has been requested by a user. Step 1025 checks whether all nodes must be positioned so that each node prints on a single page. If the inquiry to decision step 1025 is negative, then the "No" branch is followed to step 1050. If the inquiry to step 1025 is positive, then the "Yes" branch is followed to step 1030 in which the location of the page boundaries that would occur if the entire diagram were printed based on the current printer settings is estimated.

In step. 1040, for each row or column that overlaps the computed page boundary, the previous inter-row or inter-column spacing is increased to align the row or column boundary of the respective row or column with the page boundary. In step 1050, for each node, the physical node coordinates are computed based upon the physical row and column coordinates. Next, in decision step 1060, it is determined whether the selective layout option has been activated where some of the nodes are fixed.

If the inquiry to decision step 1060 is negative, then the "No" branch is followed to step 1090. If the inquiry to decision step 1060 is positive, then the "Yes" branch is followed to step 1070.

In step 1070 for each selected node, the computed physical coordinates of the node as well as a node's fixed parent are used to compute the relative offset of a node from its "FixedParent." Then in step 1080, the final physical node coordinates within a display are computed based upon the relative offset of a node from its "FixedParent." In step 1090, for each node in the preliminary layout node array, each node is positioned according to the calculated physical coordinates of the display. The process then returns to step 350 of FIG. 3.

TABLE 1—MAPPING FOR VARIABLES OF FLOWCHARTS IN FIGS. 4–8B

Table 1 illustrates the values of the variables present within the detailed exemplary processes illustrated in FIGS. 4–8B. The values within Table 1 were derived from the data set forth in Table 200B as illustrated in FIG. 2A. Some of the steps listed in Table 1 have been assigned letters that correspond with the letters of FIG. 3E–3O. That is, certain steps have letter designations after their respective number in order to illustrate the tracking of data within the virtual grid 212 illustrated in FIG. 3E–FIG. 3O. The present invention is not limited to the data contained within Table 1 and has been provided to illustrate the inventive processes of the invention. Further, the present invention is not limited to the detailed steps of the processes illustrated in FIGS. 3C–10. Those skilled in the art will appreciate that other programming techniques or shortcuts can be substituted for the various steps employed by the present invention without departing from the scope and spirit of the invention. It is noted that for many array values, a first value in an array (such as for data corresponding to task 1) is typically assigned a value of zero. That is, an Index value of zero corresponds to the first node or task in the data table. Similarly, first rows and first columns are also assigned the value of zero.

It should be understood that the foregoing relates only to illustrative embodiments of the present invention, and that numerous changes may be made therein without departing from the spirit and scope of the invention as defined by the following claims.

What is claimed is:

1. A method for creating a customizable network diagram comprising the steps of:
   obtaining data from a database for a plurality of nodes;
   identifying top-level nodes and subordinate nodes from the plurality of nodes;
   forming one or more node chains with top-level nodes starting a respective node chain;
   tracking relative positions of nodes within a node chain based upon relationships between nodes present in the database;
   assigning one or more relative positions for nodes based upon relationships between top-level nodes and subordinate nodes;
   assigning coordinates to each node based upon the relative positions; and
   displaying the plurality of nodes on a display device in accordance with the assigned coordinates and where each node comprises a graphical object representing a task having a size and shape independent of time.

2. The method of claim 1, further comprising the step of determining whether one or more predefined layouts exists for a particular node.

3. The method of claim 2, wherein a predefined layout comprises at least one of a selective layout, a time-based layout, and a filtered-layout.

4. The method of claim 2, further comprising the step of tracking a virtual grid coordinate for each node.

5. The method of claim 1, further comprising the step of aligning nodes within one or more node chains.

6. The method of claim 1, wherein the step of tracking relative positions of nodes further comprises the step of monitoring positions of the nodes within a virtual grid.

7. The method of claim 1, wherein the step of re-assigning one or more relative positions for nodes further comprises the steps:
   determining whether a successor node has been assigned a position in a virtual grid; and
   determining which node chain has fewer nodes between respective top-level nodes and a successor node common to two or more node chains.

8. The method of claim 1, wherein the step of assigning coordinates to each node based upon the relative positions further comprises the steps of:
   removing empty rows existing between two node chains; and
   assigning coordinates for each node corresponding to virtual grid coordinates.

9. The method of claim 8, further comprising the step of mapping the virtual grid coordinates to screen coordinates while adjusting for formatting parameters.

10. The method of claim 9, wherein the step of adjusting for formatting parameters further comprises the step of aligning nodes based upon at least one of node sizes and shapes.

11. The method of claim 9, wherein the step of adjusting for formatting parameters further comprises the step of aligning nodes according to one or more selected layouts for the entire network diagram.

12. The method of claim 9, wherein the step of adjusting for formatting parameters further comprises the step of aligning nodes according to selectable page breaks.

13. A computer readable medium having computer-executable instructions for performing the steps recited in claim 1.

14. A method for creating a network diagram comprising the steps of:
   identifying one or more top-level nodes and one or more successor nodes from a data source;
   forming one or more node chains by starting each node chain with a respective top-level node; and
   displaying the one or more node chains that comprise balanced and logical presentations of the interrelationships between the nodes where links between nodes flow in a substantially smooth manner and where intersections between links are minimized.

15. The method of claim 14, further comprising the step of:
   for initial passes in each node chain, tracking relative positions of one or more first child nodes in a left-to-right fashion within a virtual grid.

16. The method of claim 15, further comprising the step of:
   for any secondary passes in each node chain, tracking relative positions of one or more second child nodes by starting examination of the one or more second child nodes in a right-to-left fashion within a virtual grid.

17. The method of claim 14, further comprising the step of tracking relative positions of nodes within a node chain based upon relationships between nodes present in the data source.

18. A computer system for creating a network diagram, comprising:
   a processing unit;
   a memory storage device;
   a display device coupled to the processing unit for displaying data; and
   one or more program modules stored in said memory storage device for providing instructions to said processing unit;
   said processing unit responsive to said instructions of said one or more program modules, operable for
   identifying top-level nodes and subordinate nodes from the plurality of nodes;
   forming one or more node chains with top-level nodes starting a respective node chain;
   assigning one or more relative positions for nodes based upon relationships between top-level nodes and subordinate nodes and relationships between parent nodes and successor nodes;
   assigning coordinates to each node based upon the relative positions; and
   displaying the plurality of nodes on said display device in accordance with the assigned coordinates and where each node comprises a graphical object representing a task having a size and shape independent of time.

19. The computer system of claim 18, wherein said processing unit is further operative for tracking relative positions of nodes within a node chain based upon relationships between nodes present in the database.

20. The computer system of claim 18, wherein said processing unit is further operative for determining whether one or more predefined layouts exists for a particular node.

* * * * *